United States Patent
Zhang

(10) Patent No.: US 9,316,880 B2
(45) Date of Patent: Apr. 19, 2016

(54) LIQUID CRYSTAL DISPLAY DEVICE

(71) Applicant: Semiconductor Energy Laboratory Co., Ltd., Atsugi-shi, Kanagawa-ken (JP)

(72) Inventor: Hongyong Zhang, Yamato (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 49 days.

(21) Appl. No.: 14/192,020

(22) Filed: Feb. 27, 2014

(65) Prior Publication Data

US 2014/0176842 A1    Jun. 26, 2014

Related U.S. Application Data

(60) Continuation of application No. 13/484,800, filed on May 31, 2012, now Pat. No. 8,665,411, which is a continuation of application No. 13/153,495, filed on Jun. 6, 2011, now Pat. No. 8,194,224, which is a (Continued)

(30) Foreign Application Priority Data

Dec. 21, 1995  (JP) ........................... 7-350229

(51) Int. Cl.
G02F 1/1339    (2006.01)
G02F 1/1345    (2006.01)
G02F 1/1362    (2006.01)

(52) U.S. Cl.
CPC ........ *G02F 1/136286* (2013.01); *G02F 1/1339* (2013.01); *G02F 1/13454* (2013.01)

(58) Field of Classification Search
CPC ... G02F 1/1339; G02F 1/1341; G02F 1/1345; G02F 1/133351; G02F 1/133394; G02F 1/13452; G02F 1/13454; H05K 3/361

USPC ................. 349/153, 190, 149, 151
See application file for complete search history.

(56) References Cited

U.S. PATENT DOCUMENTS 5,076,667 A    12/1991    Stewart et al.
5,105,187 A     4/1992    Plus et al.
(Continued)

FOREIGN PATENT DOCUMENTS

EP    0 545 712 A1    6/1993
EP    0 597 536 A     5/1994
(Continued)

OTHER PUBLICATIONS

CMI's English translation of Japanese Patent Publication JP 06-347827, Kikuo et al, Dec. 22, 1994, Document/Page No. CMI06158-CMI061220 (Case No. SA CV 12 0021).

(Continued)

*Primary Examiner* — Mike Qi
(74) *Attorney, Agent, or Firm* — Robinson Intellectual Property Law Office; Eric J. Robinson

(57) ABSTRACT

Techniques are provided for unifying steps of sealing material so that the yield and the reliability of a liquid-crystal display device become high. A starting film of scanning lines is patterned so that prismatic dummy wirings 301 for the first layer which are not electrically connected are formed in regions R1 and R2, and wirings 302 extending from the pixel section are formed in a region R3, and wirings 303 having connection end portions 303*a* are formed in a region R4. After an inter-layer insulation film is formed, the starting film of the signal lines is patterned so that the dummy wirings 304 for the second layer are formed to embed the gaps between the wirings 301 to 303, and also the wirings 305 and the wirings 303 which extend from the pixel portion are connected to each other. This permits unification of the cross-sectional structure of the sealing material formation region.

24 Claims, 12 Drawing Sheets

Related U.S. Application Data continuation of application No. 12/165,783, filed on Jul. 1, 2008, now Pat. No. 7,956,978, which is a division of application No. 10/811,920, filed on Mar. 30, 2004, now Pat. No. 7,394,516, which is a division of application No. 09/316,697, filed on May 21, 1999, now Pat. No. 7,333,172, which is a division of application No. 08/768,066, filed on Dec. 16, 1996, now Pat. No. 5,995,189.

(56) References Cited

U.S. PATENT DOCUMENTS

| | | | |
|---|---|---|---|
| 5,148,301 | A | 9/1992 | Sawatsubashi et al. |
| 5,151,689 | A | 9/1992 | Kabuto et al. |
| 5,162,901 | A | 11/1992 | Shimada et al. |
| 5,179,460 | A | 1/1993 | Hinata et al. |
| 5,200,847 | A | 4/1993 | Mawatari et al. |
| 5,202,778 | A | 4/1993 | Niki |
| 5,278,682 | A | 1/1994 | Niki |
| 5,285,300 | A | 2/1994 | Suzuki et al. |
| 5,285,301 | A | 2/1994 | Shirahashi et al. |
| 5,323,042 | A | 6/1994 | Matsumoto |
| 5,327,267 | A | 7/1994 | Aoki et al. |
| 5,365,357 | A | 11/1994 | Ohgawara et al. |
| 5,396,356 | A | 3/1995 | Fukuchi |
| 5,406,398 | A | 4/1995 | Suzuki et al. |
| 5,429,962 | A | 7/1995 | Yang |
| 5,446,562 | A | 8/1995 | Sato |
| 5,488,498 | A | 1/1996 | Fujii et al. |
| 5,504,601 | A | 4/1996 | Watanabe et al. |
| 5,508,532 | A | 4/1996 | Teramoto |
| 5,513,028 | A | 4/1996 | Sono et al. |
| 5,517,344 | A | 5/1996 | Hu et al. |
| 5,530,568 | A | 6/1996 | Yamamoto et al. |
| 5,537,235 | A | 7/1996 | Ishihara et al. |
| 5,541,748 | A | 7/1996 | Ono et al. |
| 5,559,526 | A | 9/1996 | Izawa |
| 5,572,046 | A | 11/1996 | Takemura |
| 5,598,283 | A | 1/1997 | Fujii et al. |
| 5,619,044 | A | 4/1997 | Makita et al. |
| 5,619,258 | A | 4/1997 | Gillespie |
| 5,619,358 | A | 4/1997 | Tanaka et al. |
| 5,621,553 | A | 4/1997 | Nishiguchi et al. |
| 5,644,373 | A | 7/1997 | Furushima et al. |
| 5,654,781 | A | 8/1997 | Izumi |
| 5,659,379 | A | 8/1997 | Morimoto |
| 5,684,547 | A | 11/1997 | Park et al. |
| 5,684,555 | A | 11/1997 | Shiba et al. |
| 5,691,793 | A | 11/1997 | Watanabe et al. |
| 5,706,069 | A | 1/1998 | Hermens et al. |
| 5,744,820 | A | 4/1998 | Matsushima et al. |
| 5,745,208 | A | 4/1998 | Grupp et al. |
| 5,757,450 | A | 5/1998 | Fujii et al. |
| 5,760,854 | A | 6/1998 | Ono et al. |
| 5,798,812 | A | 8/1998 | Nishiki et al. |
| 5,837,569 | A | 11/1998 | Makita et al. |
| 5,838,411 | A | 11/1998 | Hayakawa et al. |
| 5,929,829 | A | 7/1999 | Pitt |
| 5,929,959 | A | 7/1999 | Iida et al. |
| 5,995,189 | A | 11/1999 | Zhang |
| 6,011,607 | A | 1/2000 | Yamazaki et al. |
| 6,037,005 | A | 3/2000 | Moshrefzadeh et al. |
| 6,055,034 | A | 4/2000 | Zhang et al. |
| 6,072,556 | A | 6/2000 | Hirakata et al. |
| 6,088,073 | A | 7/2000 | Hioki et al. |
| 6,172,732 | B1 | 1/2001 | Hayakawa et al. |
| 7,394,516 | B2 | 7/2008 | Zhang |
| 7,956,978 | B2 * | 6/2011 | Zhang .......................... 349/153 |
| 8,068,204 | B2 | 11/2011 | Hirakata et al. |
| 8,665,411 | B2 * | 3/2014 | Zhang .......................... 349/153 |

FOREIGN PATENT DOCUMENTS

| | | |
|---|---|---|
| EP | 0 612 102 A2 | 8/1994 |
| EP | 0 687 936 A | 12/1995 |
| JP | 62-205320 A | 9/1987 |
| JP | 62-229234 A | 10/1987 |
| JP | 63-026631 A | 2/1988 |
| JP | 63-100427 A | 5/1988 |
| JP | 63-104025 A | 5/1988 |
| JP | 01-265229 A | 10/1989 |
| JP | 02-042420 A | 2/1990 |
| JP | 02-125231 A | 5/1990 |
| JP | 02-242230 A | 9/1990 |
| JP | 03-163418 A | 7/1991 |
| JP | 04-097321 A | 3/1992 |
| JP | 04-242719 A | 8/1992 |
| JP | 04-324826 A | 11/1992 |
| JP | 04-331920 A | 11/1992 |
| JP | 05-061072 A | 3/1993 |
| JP | 05-072540 A | 3/1993 |
| JP | 05-127181 A | 5/1993 |
| JP | 05-158015 A | 6/1993 |
| JP | 05-203966 A | 8/1993 |
| JP | 05-210369 A | 8/1993 |
| JP | 05-241153 | 9/1993 |
| JP | 05-307163 A | 11/1993 |
| JP | 05-313175 A | 11/1993 |
| JP | 06-051332 A | 2/1994 |
| JP | 06-082809 A | 3/1994 |
| JP | 06-082811 A | 3/1994 |
| JP | 06-082815 A | 3/1994 |
| JP | 06-138489 A | 5/1994 |
| JP | 06-186578 A | 7/1994 |
| JP | 06-186588 A | 7/1994 |
| JP | 06-202124 A | 7/1994 |
| JP | 06-214241 | 8/1994 |
| JP | 06-250224 A | 9/1994 |
| JP | 06-258659 A | 9/1994 |
| JP | 06-258661 A | 9/1994 |
| JP | 06-258662 A | 9/1994 |
| JP | 06-289413 A | 10/1994 |
| JP | 06-289415 A | 10/1994 |
| JP | 06-308510 A | 11/1994 |
| JP | 06-347827 A | 12/1994 |
| JP | H07-8838 A | 1/1995 |
| JP | H07-8838 U | 2/1995 |
| JP | 07-092477 A | 4/1995 |
| JP | 07-159809 A | 6/1995 |
| JP | 07-159811 A | 6/1995 |
| JP | 07-209659 A | 8/1995 |
| JP | 07-281197 A | 10/1995 |
| JP | 07-283135 A | 10/1995 |
| JP | 07-318965 A | 12/1995 |
| JP | 08-171082 A | 7/1996 |
| JP | 09-179130 A | 7/1997 |
| JP | 10-198292 A | 7/1998 |
| WO | WO-97/10529 | 3/1997 |

OTHER PUBLICATIONS

"Withdrawal: Selected IBM PS/2 Mobile Systems (300,700/700C) and Features," IBM Announcement Letter 193-268, Sep. 8, 1993.

Lewis et al., "Driver Circuits for AMLCDs," Conference Record of the 1994 International Display Research Conference (IDRC) and International Workshops on Active-Matrix LCDs & Display Materials, pp. 56-64, Oct. 10, 1994.

Defendant's Preliminary Invalidity Contentions and Accompanying Document Production dated Jun. 6, 2005 (13 pages) and Exhibits B-1 (11 pages), B-2 (10 pages), B-3 (7 pages), B-4 (6 pages), B-5 (5 pages), B-6 (9 pages), B-7 (9 pages) and B-8 (8 pages).

Revised Exhibits to Defendant's Preliminary Invalidity Contentions dated Jun. 7, 2005; Exhibits B-2 (11 pages), B-3 (7 pages), B-4 (7 pages) and B-8 (8 pages).

Memorandum & Order re: *Claim Construction, Semiconductor Energy Laboratory Co., Ltd.*, Plaintiff v. *Chi Mei Optoelectronics Corp., et al.*, Defendants, No. C04-04675 MHP, dated Mar. 24, 2006, 41 pages.

(56) References Cited

OTHER PUBLICATIONS

Complaint for Patent Infringement, and Demand for Jury Trial and Certification of Interested Parties, *Semiconductor Energy Laboratory Co., Ltd.*, Plaintiff vs. *Chi Mei Optoelectronics Corp., International Display Technology Co., Ltd., International Display Technology USA, Inc., Westinghouse Digital Electronics, LLC and CTX Technology Corp.*, Defendants dated Nov. 3, 2004.
Defendant Chi Mei Optoelectronics Corp.'s Answer to Complaint for Patent Infringement, Demand for Jury Trial, Counterclaim and Certification of Interested Parties dated Feb. 28, 2005.
Defendant Westinghouse Digital Electronics, LLC's Answer to Complaint for Patent Infringement and Certification of Interested Parties dated Feb. 28, 2005.
Defendant International Display Technology USA, Inc.'s Answer to Complaint for Patent Infringement and Certification of Interested Parties, dated Feb. 28, 2005.
Defendant Chi Mei Optoelectronics Corp.'s Response to Plaintiff Semiconductor Energy Laboratory Co., Ltd.'s First Set of Interrogatories dated Apr. 4, 2005.
Defendant's Preliminary Proposed Claim Constructions and Preliminary Identification of Extrinsic Evidence Pursuant to Patent L.R. 4-2; 108 pages; Including Exhibits A-L attached thereto; Jul. 22, 2005.
Semiconductor Energy Laboratory Co., Ltd.'s Proposed Preliminary Claim Constructions and Extrinsic Evidence; 7 pages; Jul. 22, 2005.
Semiconductor Energy Laboratory Co., Ltd.'s Patent L.R. 4-2(b) Disclosure, including documents numbered as SEL-CMO 89041-89049; 12 pages; Jul. 22, 2005.
Joint Claim Construction and Prehearing Statement; 12 pages; Aug. 5, 2005.
Semiconductor Energy Laboratory Co., Ltd.'s Opening Brief on Claim Construction and Supporting Evidence; 41 pages; Sep. 20, 2005.
Declaration of Donald R. Harris in Support of Semiconductor Energy Laboratory Co., Ltd.'s Opening Brief on Claim Construction (2 pages) and Supporting Evidence (with Exhibits 1-12); Sep. 20, 2005.
Defendants' Claim Construction Response Brief; 39 pages; Oct. 4, 2005.
Declaration of Scott R. Mosko in Support of Defendants' Claim Construction Response Brief (5 pages), including Exhibits A-X; Oct. 4, 2005.
Semiconductor Energy Laboratory Co., Ltd.'s Reply Brief on Claim Construction and Supporting Evidence; 18 pages; Oct. 11, 2005.
Declaration of Donald R. Harris in Support of Semiconductor Energy Laboratory Co., Ltd.'s Reply Brief on Claim Construction with Exhibits 14-18; 71 pages; Oct. 11, 2005.
Complaint for Patent Infringement, *Semiconductor Energy Laboratory Co., Ltd.*, Plaintiff, v *Samsung Electronics Co., Ltd., S-LCD Corporation, Samsung Electronics America, Inc. and Samsung Telecommunications America, LLC*, Defendants, filed Jan. 2, 2009; Civil Action No. 3:09-CV-0001; pp. 1-19.
Answer, Defenses, and Counterclaims of Defendants Samsung Electronics Co., Ltd., S-LCD Corporation, Samsung Electronics America, Inc. and Samsung Telecommunications America, LLC, dated Apr. 9, 2009, 29 pages, Civil Action No. 3:09-CV-00001.
First Amended Answer, Defenses, and Counterclaims of Defendants Samsung Electronics Co., Ltd., S-LCD Corporation, Samsung Electronics America, Inc. and Samsung Telecommunications America, LLC, dated Jul. 1, 2009, 33 pages, Civil Action No. 3:09-CV-00001.
Response to Defendants' First Set of Interrogatories to Plaintiff Semiconductor Energy Laboratory Co., Ltd., dated May 29, 2009, 102 pages (Appendix A-E), Civil Action No. 3:09-CV-00001.
Defendants' Answer, Defenses, and Counterclaims to Plaintiff's First Amended Complaint, dated Jul. 14, 2009, 33 pages, Civil Action No. 3:09-CV-00001.
Samsung Electronics Co., Ltd.'s Second Supplemental Responses to SEL's First Set of Interrogatories, dated Jul. 14, 2009, 73 pages, Civil Action No. 3:09-CV-00001.
Response to Defendants' Second Set of Interrogatories to Plaintiff Semiconductor Energy Laboratory Co., Ltd., dated Jul. 27, 2009, 38 pages, (Appendix A-B), Civil Action No. 3:09-CV-00001.
Plaintiff and Counterclaim Defendant SEL's Answer to Defendants' Counterclaims, dated Jul. 28, 2009, 14 pages, Civil Action No. 3:09-CV-00001.
Motion to Dismiss and/or Strike Certain Counterclaims and Defenses, dated Jul. 28, 2009, 2 pages, Civil Action No. 3:09-CV-00001.
SEL's Memorandum in Support of its Motion to Dismiss and/or Strike Certain Counterclaims and Defenses, dated Jul. 28, 2009, 15 pages, Civil Action No. 3:09-CV-00001.
Motion for Leave to File *Instanter* (1) Amended motion to dismiss and/or strike inequitable conduct allegations based on New Federal Circuit Authority; and (2) amended answer to counterclaim, dated Aug. 11, 2009, 5 pages, Civil Action No. 3:09-CV-00001.
SEL's Motion and Memorandum in Support of its Amended Motion to Dismiss and/or Strike Inequitable Conduct Allegations, dated Aug. 11, 2009, 30 pages, Civil Action No. 3:09-CV-00001.
Plaintiff and Counterclaim Defendant SEL's amended answer to Defendants' Counterclaims, dated Aug. 11, 2009, 15 pages, Civil Action No. 3:09-CV-00001.
Plaintiff and Counterclaim Defendant SEL's amended answer to Defendants' Counterclaims, dated Aug. 13, 2009, 14 pages, Civil Action No. 3:09-CV-00001.
SEL's Motion and Memorandum in Support of its Amended Motion to Dismiss and/or Strike Inequitable Conduct Allegations, dated Aug. 13, 2009, 30 pages, Civil Action No. 3:09-CV-00001.
Samsung Electronics Co., Ltd.'s Fourth Supplemental Responses to SEL's First Set of Interrogatories (Exhibit A-D), dated Aug. 28, 2009, 83 pages, Civil Action No. 3:09-CV-00001.
First Supplemental and Revised Response to Defendants' Interrogatory No. 5 to Plaintiff Semiconductor Energy Laboratory Co., Ltd. (Appendix A-H), dated Aug. 28, 2009, 161 pages, Civil Action No. 3:09-CV-00001.
Plaintiff Semiconductor Energy Laboratory Co., Ltd.'s list of proposed claim terms and proposed claim construction, dated Aug. 31, 2009, 3 pages, Civil Action No. 3:09-CV-00001.
Defendants' disclosure of claim terms to be construed and proposed constructions, dated Aug. 31, 2009, 4 pages, Civil Action No. 3:09-CV-00001.
Docket Sheet Jan. 2, 2009 through Sep. 3, 2009, 9 pages, Civil Action No. 3:09-CV-00001.
Defendants' first amended answer, defenses, and counterclaims to plaintiff's first amended complaint, dated Sep. 10, 2009, 55 pages, Civil Action No. 3:09-CV-00001.
Second Supplemental response to defendants' interrogatory No. 5 to plaintiff Semiconductor Energy Laboratory Co., Ltd., dated Sep. 14, 2009, originally 50 pages, 45 pages as redacted, Civil Action No. 3:09-CV-00001.
Plaintiff Semiconductor Energy Laboratory Co., Ltd.'s response to defendants' disclosure of claim terms to be construed and proposed constructions, dated Sep. 14, 2009, 5 pages, Civil Action No. 3:09-CV-00001.
Defendant's Response to SEL's Proposed Constructions, dated Sep. 14, 2009, 3 pages, Civil Action No. 3:09-CV-00001.
Plaintiff and Counterclaim Defendant SEL's answer to Defendants' first amended counterclaims, dated Sep. 24, 2009, 14 pages, Civil Action No. 3:09-CV-00001.
SEL's Memorandum in support of Motion to Dismiss and/or Strike Inequitable Conduct Allegations in Samsung's Amended Answer, dated Sep. 24, 2009, 34 pages, Civil Action No. 3:09-CV-00001.
Proposed Order, filed Sep. 24, 2009, 1 page, Civil Action No. 3:09-CV-00001.
Motion to Dismiss and/or Strike Inequitable Conduct Allegations in Samsung's Amended Answer, dated Sep. 24, 2009, 2 pages, Civil Action No. 3:09-CV-00001-BBC.
Defendants' First Amended Response to SEL's Proposed Constructions, dated Oct. 5, 2009, 3 pages, Civil Action No. 3:09-CV-00001.
Defendants' First Amended Disclosure of Claim Terms to be Construed and Proposed Constructions, dated Oct. 5, 2009, 4 pages, Civil Action No. 3:09-CV-00001.
Defendants' Corrected First Amended Disclosure of Claim Terms to be Construed and Proposed Constructions, dated Oct. 6, 2009, 4 pages, Civil Action No. 3:09-CV-00001.

(56) References Cited

OTHER PUBLICATIONS

Plaintiff Semiconductor Energy Laboratory Co., Ltd.'s Opening Claim Construction Brief, dated Oct. 7, 2009, 85 pages, Civil Action No. 3:09-CV-00001-BBC.
SEL'S Motion requesting Claim Construction and Hearing, dated Oct. 7, 2009, 4 pages, Civil Action No. 3:09-CV-00001-BBC.
Defendant's Motion for Construction of Claims, dated Oct. 7, 2009, 4 pages, Civil Action No. 3:09-CV-00001.
Samsung's Opening Claim Construction Brief, dated Oct. 7, 2009, 83 pages, Civil Action No. 3:09-CV-00001.
Declaration of Nicholas J. Whilt in support of Samsung's opening Claim Construction Brief, dated Oct. 7, 2009, 912 pages, Civil Action No. 3:09-CV-00001.
Samsung's opposition to SEL's motion to dismiss and/or strike inequitable conduct allegations in Samsung's amended answer, dated Oct. 15, 2009, 50 pages, Civil Action No. 3:09-CV-00001.
SEL's reply in support of its motion to dismiss and/or strike inequitable conduct allegations in Samsung's amended answer, dated Oct. 26, 2009, 34 pages, Civil Action No. 3:09-CV-00001.
SEL's response to Samsung's opening claim construction brief, dated Oct. 28, 2009, 83 pages, Civil Action No. 3:09-CV-00001-BBC.
Samsung's responsive claim construction brief, dated Oct. 28, 2009, 62 pages, Civil Action No. 3:09-CV-00001.
Third Supplemental Response to Defendants' Interrogatory No. 5 to Plaintiff Semiconductor Energy Laboratory Co., Ltd., dated Nov. 2, 2009, 9 pages, Civil Action No. 3:09-CV-00001-BBC.
SEL's Supplemental Response to Defendants' Interrogatory No. 16, dated Nov. 20, 2009, 21 pages, Civil Action No. 3:09-CV-00001-BBC.
Samsung Electronics Co., Ltd.'s fifth supplemental responses to SEL's first set of interrogatories, dated Dec. 9, 2009, 184 pages, Civil Action No. 3:09-CV-00001.
Expert Report of Dr. Aris Silzars, dated Dec. 15, 2009, originally 103 pages, 97 pages as redacted, Civil Action No. 3:09-CV-00001.
Expert report of Dr. Timothy J. Drabik regarding invalidity of U.S. Pat. No. 7,215,402 and U.S. Pat. No. 7,394,516, dated Dec. 15, 2009, 656 pages, Civil Action No. 3:09-CV-00001.
Defendants' third amended answer, defenses, and counterclaims to plaintiff's first amended complaint, dated Dec. 28, 2009, 63 pages, Civil Action No. 3:09-CV-00001.
Samsung Electronics Co., Ltd.'s second supplemental responses to SEL's second set of interrogatories, dated Dec. 31, 2009, 16 pages, Civil Action No. 3:09-CV-00001.
Samsung Electronics Co., Ltd.'s seventh supplemental responses to SEL's first set of interrogatories, dated Dec. 31, 2009, 26 pages, Civil Action No. 3:09-CV-00001.
Opinion and order, dated Jan. 5, 2010, 36 pages, Civil Action No. 3:09-CV-00001-BBC.
SEL's Supplemental Response to Defendants' Interrogatory No. 12, dated Jan. 12, 2010, 9 pages, Civil Action No. 3.09-CV-00001-BBC.
Defendants' second amended answer, defenses, and counterclaims to plaintiffs first amended complaint, dated Jan. 15, 2010, 56 pages, Civil Action No. 3:09-CV-00001.
Expert report of Dr. Aris Silzars in opposition to the Expert report of Timothy J. Drabik regarding invalidity of U.S. Pat. No. 7,394,516 and the Expert report of Dr. Richard B. Fair regarding invalidity of U.S. Pat. No. 7,413,937, dated Jan. 20, 2010, 577 pages, Civil Action No. 3:09-CV-00001.
Expert report of Nicholas P. Godici, dated Jan. 20, 2010, 89 pages, Civil Action No. 3:09-CV-00001.
Expert report of Dr. Timothy J. Drabik regarding non-infringement of U.S. Pat. No. 7,215,402 and U.S. Pat. No. 7,394,516, dated Jan. 20, 2010, 63 pages, Civil Action No. 3:09-CV-00001.
Supplemental responses to Defendants' interrogatory Nos. 1, 2-3, 5-6, 8-9, 11-12, and 16-18 to Plaintiff Semiconductor Energy Laboratory co., ltd., dated Jan. 21, 2010, 29 pages, Civil Action No. 3:09-CV-00001-BBC.
Plaintiff's motion for partial summary judgment, dated Jan. 22, 2010, 4 pages, Civil Action No. 3:09-CV-00001-BBC.

Declaration of Jeffrey A. Koppy in support of partial summary judgment, dated Jan. 22, 2010, 2558 pages, Civil Action No. 3:09-CV-00001-BBC.
Defendant Samsung's Motion for Summary Judgment Regarding U.S. Pat. No. 6,900,463, U.S. Pat. No. 7,413,937, U.S. Pat. No. 7,215,402, and U.S. Pat. No. 7,394,516, dated Jan. 22, 2010, 4 pages, Civil Action No. 3:09-CV-00001.
Proposed findings of fact in support of Samsung's motion for summary judgment regarding U.S. Pat. No. 6,900,463,U.S. Pat. No. 7,413,937,U.S. Pat. No. 7,215,402, and U.S. Pat. No. 7,394,516, dated Jan. 22, 2010, 208 pages, Civil Action No. 3:09-CV-00001.
Declaration of Ryan K. Yagura in support of Samsung's motion for summary judgment, dated Jan. 22, 2010, 3805 pages, Civil Action No. 3:09-CV-0000L.
Defendants' third amended answer, defenses, and counterclaims to plaintiff's first amended complaint, dated Jan. 22, 2010, 62 pages, Civil Action No. 3:09-CV-00001.
Declaration of Dr. Timothy J. Drabik in support of Samsung's Motion for Summary Judgment, dated Jan. 22, 2010, 152 pages, Civil Action No. 3:09-CV-00001.
Corrected SEL's memorandum of law in support of its motion for partial summary judgment, dated Jan. 26, 2010, originally 134 pages, 108 pages as redacted, Civil Action No. 3:09-CV-00001-BBC.
Corrected proposed findings of fact, dated Jan. 26, 2010, originally 84 pages, 55 pages as redacted, Civil Action No. 3:09-CV-00001-BBC.
Corrected proposed finding of facts in support of Samsung's motion for summary judgment regarding U.S. Pat. No. 6,900,463, U.S. Pat. No. 7,413,937, U.S. Pat. No. 7,215,402, and U.S. Pat. No. 7,394,516, dated Jan. 29, 2010, 208 pages, Civil Action No. 3:09-CV-00001.
Corrected brief in support of Samsung's motion for summary judgment regarding U.S. Pat. No. 6,900,463, U.S. Pat. No. 7,413,937, U.S. Pat. No. 7,215,402, and U.S. Pat. No. 7,394,516, dated Jan. 29, 2010, 157 pages, Civil Action No. 3:09-CV-00001.
Samsung's Corrected Exhibits to Declaration of Motion for Summary Judgment, dated Jan. 29, 2010, 50 pages, Civil Action No. 3:09-CV-00001-BBC.
Plaintiff and counterdefendant SEL's Answer to Defendants' third amended counterclaims, dated Feb. 5, 2010, 14 pages, Civil Action No. 3:09-CV-00001-BBC.
Docket Sheet Sep. 19, 2009 through Feb. 5, 2010, 44 pages, Civil Action No. 3:09-CV-00001.
Samsung's Opposition to SEL's Corrected Motion for Partial Summary Judgment with Exhibit(s) dated Feb. 12, 2010, 219 pages, Civil Action No. 3:09-CV-00001.
Declaration of Frank S. Barrese Re: Documents Produced by International Business Machines Corporation with Exhibits dated Feb. 12, 2010, 30 pages, Civil Action No. 3:09-CV-00001.
Supplemental Declaration of Dr. Timothy J. Drabik in Support of Samsung's Opposition to SEL's Corrected Motion for Partial Summary Judgment with Exhibits dated Feb. 12, 2010, originally 90 pages, 76 pages as redacted, Civil Action No. 3:09-CV-00001.
Samsung's Supplemental Proposed Findings of Fact in Opposition to SEL's Corrected Motion for Partial Summary Judgment dated Feb. 12, 2010, 248 pages, Civil Action No. 3:09-CV-00001.
Samsung's Response to SEL's Corrected Proposed Findings of Fact dated Feb. 12, 2010, 222 pages, Civil Action No. 3:09-CV-00001.
SEL's Response to Defendants' Motion for Summary Judgment dated Feb. 12, 2010, 171 pages, Civil Action No. 3:09-CV-00001.
SEL's Responsive Proposed Findings of Fact in Support of Its Opposition to Defendants' Motion for Summary Judgment Regarding U.S. Pat. No. 6,900,463, U.S. Pat. No. 7,413,937, U.S. Pat. No. 7,215,402, U.S. Pat. No. 7,394,516 dated Feb. 13, 2010, originally 125 pages, 114 pages as redacted, Civil Action No. 3:09-CV-00001.
SEL's Response to Samsung's Proposed Findings of Fact dated Feb. 13, 2010, 336 pages, Civil Action No. 3:09-CV-00001.
Samsung's Reply in Support of its Corrected Motion for Summary Judgment dated Feb. 22, 2010, 178 pages, Civil Action No. 3:09-CV-00001.
Reply to SEL's Response to Samsung's Proposed Findings of Fact dated Feb. 22, 2010, 812 pages, Civil Action No. 3:09-CV-00001.
Response to SEL's Responsive Proposed Findings of Fact in Support of Its Opposition to Defendants' Motion for Summary Judgment

(56) References Cited

OTHER PUBLICATIONS

Regarding U.S. Pat. No. 6,900,463, U.S. Pat. No. 7,413,937, U.S. Pat. No. 7,215,402, U.S. Pat. No. 7,394,516 dated Feb. 22, 2010, originally 359 pages, 328 pages as redacted, Civil Action No. 3:09-CV-00001.

SEL's Reply in Support of its Motion for Partial Summary Judgment dated Feb. 22, 2010, originally 162 pages, 141 pages as redacted, Civil Action No. 3:09-CV-00001.

SEL's Response to Samsung's Supplemental Proposed Findings of Fact in Opposition to SEL's Corrected Motion for Partial Summary Judgment dated Feb. 22, 2010, 439 pages, Civil Action No. 3:09-CV-00001.

SEL's Reply to Samsung's Response to SEL's Corrected Proposed Findings of Fact[1] dated Feb. 22, 2010, 263 pages, Civil Action No. 3:09-CV-00001.

SEL's Motion for Leave to Supplement the Expert Report of Dr. Aris Silzars dated Mar. 19, 2010, 4 pages, Civil Action No. 3:09-CV-00001.

Memorandum in Support of SEL's Motion for Leave to Supplement the Expert Report of Dr. Aris Silzars dated Mar. 19, 2010, 8 pages, Civil Action No. 3:09-CV-00001.

Samsung's Opposition to SEL's Motion for Leave to Supplement the Expert Report of Dr. Aris Silzars dated Mar. 27, 2010, 22 pages, Civil Action No. 3:09-CV-00001.

Corrected Declaration of Brian M. Berliner in Support of Samsung's Brief in Opposition to SEl's Motion for Leave to Supplement the Expert Report of Dr. Aris Silzars with Exhibits dated Mar. 29, 2010, 89 pages, Civil Action No. 3:09-CV-00001.

Reply Brief in Support of SEL's Motion for Leave to Supplement the Expert Report of Dr. Aris Silzars dated Mar. 31, 2010, 22 pages, Civil Action No. 3:09-CV-00001.

Declaration of Jeffrey A. Koppy in Support of SEL's Reply Brief in Support of SEL's Motion for Leave to Supplement the Expert Report of Dr. Aris Silzars with Exhibits dated Mar. 31, 2010, 98 pages, Civil Action No. 3:09-CV-00001.

SEL's Motion for Leave to File a Corrected Supplemental Expert Report of Dr. Aris Silzars dated Apr. 7, 2010, 7 pages, Civil Action No. 3:09-CV-00001.

Declaration of Jeffrey A. Koppy in Support of SEL's Motion for Leave to File a Corrected Supplemental Expert Report of Dr. Aris Silzars with Exhibits dated Apr. 7, 2010, 93 pages, Civil Action No. 3:09-CV-00001.

Samsung Electronics Co., Ltd.'s Fifth Supplemental Responses to SEL's Interrogatory No. 3 with Exhibits dated Apr. 13, 2010, 45 pages, Civil Action No. 3:09-CV-00001.

Samsung's Opposition to SEL's Motion for Leave to File a Corrected Supplemental Expert Report of Dr. Aris Silzars dated Apr. 14, 2010, 20 pages, Civil Action No. 3:09-CV-00001.

Second declaration of Brian M. Berliner in Support of Samsung's Brief in Opposition to SEL's Motion for Leave to File a Corrected Supplemental Expert Report of Dr. Aris Silzars dated Apr. 14, 2010, 6 pages, Civil Action No. 3:09-CV-00001.

Reply Brief in Support of SEL's Motion for Leave to File a Corrected Supplemental Expert Report of Dr. Aris Silzars dated Apr. 26, 2010, 15 pages, Civil Action No. 3:09-CV-00001.

Declaration of Jeffrey A. Koppy in Support of Reply Brief in Support of SEL's Motion for Leave to File a Corrected Supplemental Expert Report of Dr. Aris Silzars dated Apr. 26, 2010, 2 pages, Civil Action No. 3:09-CV-00001.

Samsung's Opposition to SEL's Motion for Leave to Supplement the Expert Witness Report of Professor Paul A. Kohl dated Apr. 30, 2010, 18 pages, Civil Action No. 3:09-CV-00001.

Second Declaration of Brian M. Berliner in Support of Samsung's Brief in Opposition to SEL's Motion for Leave to Supplement the Expert Witness Report of Professor Paul A. Kohl with Exhibits dated Apr. 30, 2010, 21 pages, Civil Action No. 3:09-CV-00001.

Reply Brief in Support of SEL's Motion for Leave to Supplement the Expert Witness Report of Professor Paul A. Kohl dated May 5, 2010, 17 pages, Civil Action No. 3:09-CV-00001.

Declaration of Jeffrey A. Koppy in Support of SEL's Reply of SEL's Motion to Supplement the Expert Witness Report of Professor Paul A. Kohl with Exhibits dated May 5, 2010, 10 pages, Civil Action No. 3:09-CV-00001.

Supplemental Responses to Defendants' Interrogatory Nos. 3, 5-10, 12, 16-17, 22-24, and 27 to Plaintiff Semiconductor Energy Laboratory Co., Ltd. dated May 7, 2010, 25 pages, Civil Action No. 3:09-CV-00001.

Response to Defendants' Seventh Set of Interrogatories (Nos. 29-40) to Plaintiff Semiconductor Energy Laboratory Co., Ltd. dated May 7, 2010, 23 pages, Civil Action No. 3:09-CV-00001.

Response to Defendants' First Set of Request for Admission dated May 7, 2010, 42 pages, Civil Action No. 3:09-CV-00001.

Samsung Electronics Co., Ltd.'s Responses to SEL's First Set of Requests for Admissions dated May 7, 2010, 5 pages, Civil Action No. 3:09-CV-00001.

Samsung Mobile Display Co., Ltd.'s Responses to SEL's First Set of Requests for Admission dated May 7, 2010, 5 pages, Civil Action No. 3:09-CV-00001.

Samsung Electronics America, Inc's Responses to SEL's First Set of Requests for Admission dated May 7, 2010, 5 pages, Civil Action No. 3:09-CV-00001.

Samsung Telecommunications America, LLC's Responses to SEL's First Set of Requests for Admission dated May 7, 2010, 5 pages, Civil Action No. 3:09-CV-00001.

S-LCD Corporation's Responses to SEL's First Set of Requests for Admission dated May 7, 2010, 5 pages, Civil Action No. 3:09-CV-00001.

Samsung Electronics Co., Ltd.'s Third Supplemental Responses to SEL's Second Set of Interrogatories dated May 7, 2010, 23 pages, Civil Action No. 3:09-CV-00001.

Samsung Electronics Co., Ltd.'s Thirteenth Supplemental Response to SEL's First Set of Interrogatories dated May 7, 2010, 54 pages, Civil Action No. 3:09-CV-00001.

Docket Sheet Feb. 6, 2010 through May 7, 2010, 59 pages, Civil Action No. 3:09-CV-00001.

Complaint for Patent Infringement (Case No. SA CV 12 0021) filed Jan. 5, 2012 in the United States District Court for the Central District of California. *Semiconductor Energy Laboratory Co., Ltd.*, Plaintiff vs. *Chi Mei Innolux Corporation, Chi Mei Optoelectronics USA, Inc., Acer America Corporation, ViewSonic Corporation, VIZIO, Inc., and Westinghouse Digital, LLC*, Defendants.

Defendants' Invalidity Contentions dated Sep. 13, 2012, 965 pages including exhibits (Case No. SA CV 12 0021).

CMI's English translation of Utility Model Application Publication No. H07-8838, Adachi, Feb. 7, 1995, Document/Page No. CMI061585-CMI061597 (Case No. SA CV 12 0021).

SEL's English translation of Utility Model Application Publication No. H07-8838, Adachi, Feb. 7, 1995, pp. 1-16 (Case No. SA CV 12 0021).

CMI's English translation of Japanese Patent Publication JP 7-08838, Sakai, Jan. 13, 1995, Document/Page No. CMI061221-CMI061233 (Case No. SA CV 12 0021).

CMI's English translation of Japanese Patent Publication JP 06-047827, Kikuo et al, Dec. 22, 1994, Document/Page No. CMI06158-CMI061220 (Case No. SA CV 12 0021).

Semiconductor Energy Laboratory Co., Ltd.'s Proposed Terms for Construction dated Sep. 27, 2012, 5 pages (Case No. SA CV 12 0021).

Defendants' Disclosure of Proposed Terms and Claim Elements for Construction Under Local Patent Rule 4-1 dated Sep. 27, 2012, 14 pages (Case No. SA CV 12 0021).

Semiconductor Energy Laboratory Co., Ltd.'s Proposed Preliminary Claim Constructions and Extrinsic Evidence dated Oct. 18, 2012, 44 pages (Case No. SA CV 12 0021).

Semiconductor Energy Laboratory Co., Ltd.'s Patent L.R. 4-2(b) Disclosure dated Oct. 18, 2012, 13 pages (Case No. SA CV 12 0021).

Defendant's Proposed Preliminary Claim Constructions and Extrinsic Evidence Pursuant to Local Patent Rule 4-2 dated Oct. 18, 2012, 44 pages (Case No. SA CV 12 0021).

Joint Claim Construction and Prehearing Statement dated Nov. 12, 2012, 73 pages (Case No. SA CV 12 0021).

(56) References Cited

OTHER PUBLICATIONS

Request for Inter Partes Review of U.S. Pat. No. 7,956,978 Under 35 U.S.C. §§ 311-319 37 C.F.R. § 42.100 Et Seq. dated Nov. 6, 2012, including exhibits (IPR2013-00038) 275 pages.
Decision Institution of Inter Partes Review 37 C.F.R. § 42.108 dated Mar. 21, 2013 (IPR2013-00038) 25 pages.
Decision Request for Rehearing 37 C.F.R. § 42.71 (d) dated Apr. 30, 2013 (IPR2013-00038) 11 pages.
Deposition Transcript of Miltiadis Hatalis, Ph.D dated May 20, 2013, (in re *Innolux Corporation* v *Patent of Semiconductor Energy Laboratory Co, Ltd.*, No. IPR2013-00038, U.S. Pat. No. 7,956,978), 235 Pages.
Signature and Errata (Deposition transcript of Miltiadis Hatalis, Ph.D dated May 20, 2013) dated Jun. 19, 2013 (in re *Innolux Corporation* v *Patent of Semiconductor Energy Laboratory Co, Ltd.*, No. IPR2013-00038, U.S. Pat. No. 7,956,978) 4 Pages.
Petitioner's Opposition to Motion to Amend dated Sep. 23, 2013 (in re *Innolux Corporation* v. *Patent of Semiconductor Energy Laboratory Co., Ltd.*, No. IPR2013-00038, U.S. Pat. No. 7,956,978) 17 pages.
Petitioner's Reply to Response of the Patent Owner dated Sep. 23, 2013 (in re *Innolux Corporation* v. *Patent of Semiconductor Energy Laboratory Co., Ltd.*, No. IPR2013-00038, U.S. Pat. No. 7,956,978) 20 pages.
Exhibit No. 1006 (U.S. Pat. No. 7,956,978; exhibit to Deposition of Roger Stewart, dated Aug. 22, 2013) (in re *Innolux Corporation* v. *Patent of Semiconductor Energy Laboratory Co., Ltd.*, No. IPR2013-00038, U.S. Pat. No. 7,956,978) 30 pages.
Exhibit No. 1007 (U.S. Pat. No. 5,513,028; exhibit to Deposition of Roger Stewart, dated Aug. 22, 2013) (in re *Innolux Corporation* v. *Patent of Semiconductor Energy Laboratory Co., Ltd.*, No. IPR2013-00038, U.S. Pat. No. 7,956,978) 14 pages.
Exhibit No. 1008 (U.S. Pat. No. 5,504,601; exhibit to Deposition of Roger Stewart, dated Aug. 22, 2013) (in re *Innolux Corporation* v. *Patent of Semiconductor Energy Laboratory Co., Ltd.*, No. IPR2013-00038, U.S. Pat. No. 7,956,978) 26 pages.
Exhibit No. 1009 (Declaration of Roger Stewart; exhibit to Deposition of Roger Stewart, dated Aug. 22, 2013) (in re *Innolux Corporation* v. *Patent of Semiconductor Energy Laboratory Co., Ltd.*, No. IPR2013-00038, U.S. Pat. No. 7,956,978) 80 pages.
Exhibit No. 1010 (21:2: Polycrystalline Silicon Liquid LCDs with High-Speed Integrated Scanners; exhibit to Deposition of Roger Stewart, dated Aug. 22, 2013) (in re *Innolux Corporation* v. *Patent of Semiconductor Energy Laboratory Co., Ltd.*, No. IPR2013-00038, U.S. Pat. No. 7,956,978) 2 pages.
Exhibit No. 1011 (Integrated Driver Circuitry for Active Matrix Liquid Crystal Displays; exhibit to Deposition of Roger Stewart, dated Aug. 22, 2013) (in re *Innolux Corporation* v. *Patent of Semiconductor Energy Laboratory Co., Ltd.*, No. IPR2013-00038, U.S. Pat. No. 7,956,978) 7 pages.
Exhibit No. 1012 filed Sep. 23, 2013 (Deposition transcript of Miltiadis Hatalis, Ph.D dated May 20, 2013) (in re *Innolux Corporation* v. *Patent of Semiconductor Energy Laboratory Co., Ltd.*, No. IPR2013-00038, U.S. Pat. No. 7,956,978) 235 pages.
Exhibit No. 1013 filed Sep. 23, 2013 (Declaration of Miltiadis Hatalis, Ph.D in support of Innolux Corp.'s Opposition to Motion to Amend and Reply to Response of Patent Owner dated Sep. 23, 2013 (in re *Innolux Corporation* v. *Patent of Semiconductor Energy Laboratory Co., Ltd.*, No. IPR2013-00038, U.S. Pat. No. 7,956,978) 60 pages.
Exhibit No. 1014 filed Sep. 23, 2013 (Deposition transcript of Roger Stewart, dated Aug. 22, 2013) (in re *Innolux Corporation* v. *Patent of Semiconductor Energy Laboratory Co., Ltd.*, No. IPR2013-00038, U.S. Pat. No. 7,956,978) 266 pages.
Signature and Errata (Deposition transcript of Roger Stewart dated Sep. 19, 2013) (in re *Innolux Corporation* v *Patent of Semiconductor Energy Laboratory Co, Ltd.*, No. IPR2013-00038, U.S. Pat. No. 7,956,978) 2 Pages.
Deposition transcript of Miltiadis Hatalis, Ph.D dated Nov. 22, 2013 (in re *Innolux Corporation* v. *Patent of Semiconductor Energy Laboratory Co., Ltd.*, No. IPR2013-00038, U.S. Pat. No. 7,956,978) 227 pages.
Order Granting Rule 41 Stipulation of Dismissal dated Dec. 5, 2013, (Case No. SACV 12-0021-JLS (JPRx)),1 page.
Report on the Filing or Determination of an Action Regarding a Patent or Trademark dated Dec. 6, 2013, 1 page.
Exhibit to Report on the Determination dated Dec. 6, 2013, (Case No. SACV 12-0021-JLS (JPRx)),1 page.
Judgment Termination of the Proceeding 37 C.F.R. § 42.73 dated Dec. 11, 2013 (IPR2013-00038, U.S. Pat. No. 7,956,978) 3 pages.

\* cited by examiner

SIGNAL LINE DRIVE CIRCUIT SIDE
REGION R2

SIGNAL LINE DRIVE CIRCUIT SIDE
REGION R1

SIGNAL LINE EXTENSION SIDE
REGION R3

SIGNAL LINE EXTENSION SIDE
REGION R4

SIGNAL LINE DRIVE CIRCUIT SIDE
REGION R2

SIGNAL LINE DRIVE CIRCUIT SIDE
REGION R1

SIGNAL LINE EXTENSION SIDE
REGION R3

SIGNAL LINE EXTENSION SIDE
REGION R4

PIXEL PORTION

LIQUID CRYSTAL DISPLAY DEVICE

BACKGROUND OF THE INVENTION

1. Field of the Invention

The present invention relates to a liquid-crystal display device of the active matrix system for reducing failure occurring when bonding substrates, and more particularly to a peripheral circuit integral type liquid-crystal display device.

2. Description of the Related Art

A conventional active matrix liquid-crystal display device is so designed as to control the optical characteristics such as a light transmission property of a liquid-crystal material which is held between a pair of pixel electrodes using the switching operation of a two-terminal element such as an MIM which is disposed in a pixel section in the form of a matrix or a three-terminal element such as a TFT, for display. In general, TFTs using amorphous silicon have been widely used for the switching element of the pixel electrodes.

However, because the mobility of the electric field effect of amorphous silicon is low to the degree of 0.1 to 1 cm/Vs, the TFT using amorphous silicon cannot be disposed in a peripheral drive circuit that controls the TFT connected to the pixel electrode.

For that reason, in the conventional active matrix liquid-crystal device, the peripheral drive circuit which is made up of a semiconductor integrated circuit is attached externally to a liquid-crystal panel through the tape automatic bonding (TAB) technique or the chip on glass (COG) technique.

FIG. 16 is a front view showing the outline of an active matrix liquid-crystal panel in accordance with a first conventional example, to which a peripheral drive circuit is attached externally. As shown in FIG. 16, scanning lines 2 and signal lines 3 are disposed on an element substrate 1 made of, for example, glass or quartz in a matrix, and in a pixel section 4, pixel electrodes and a switching pixel TFT for the pixel electrodes are connected to each of the cross portions of those wirings. The scanning lines 2 and the signal lines 3 extend up to the outside of a sealing material region 5, respectively, and for that reason, the number of wirings which are transverse to the sealing material is as much as the number of the scanning lines 2 and the signal lines 3 at the minimum. The ends of those wirings four extension terminals 6 as they are, and the extension terminals 6 are connected with a peripheral drive circuit not shown. Furthermore, the element substrate 1 is joined to an opposite substrate not shown through the sealing material disposed in. the sealing material region 5, and a liquid-crystal material is interposed between those substrates through the sealing material.

Also, in recent years, in order to obtain a TFT with a large mobility of the electric field effect, a technique for fabricating the TFT using crystalline silicon has been intensively researched. The TFT using the crystalline silicon enables operation which is remarkably higher than that of an amorphous silicon TFT, and not only a TFT of NMOS but also a TFT of PMOS are obtained from crystalline silicon in the same manner, thereby being capable of obtaining a CMOS circuit. Hence, a display section as well as the peripheral drive circuit can be fabricated on the same substrate.

FIG. 17 is a front view showing the outline of an active matrix liquid-crystal display device in accordance with a second conventional example, in which a peripheral drive circuit and a display section are integrated on a panel. As shown in FIG. 17, a pixel section 12 is disposed on an element substrate 11 made of, for example, glass or quartz, and a signal line drive circuit 13 is disposed on an upper side of the pixel section 12 around the pixel section 12, and a scanning line drive circuit 14 is disposed on a left side thereof. Signal lines 15 and scanning lines 16 are connected to the signal line drive circuit 13 and the scanning line drive circuit 14, respectively. The signal lines 15 and the scanning lines 16 form a lattice in the pixel section 12, and the ends of the signal lines 15 and the scanning lines 16 extend up to the outside of the sealing material region 17 and are connected with a control circuit, a power supply not shown, or the like. Also, the element substrate 11 and the opposite substrate 18 are joined to each other through the sealing material formed in the sealing material region 17, and a liquid-crystal material is interposed between those substrates 11 and 14 by the shape of the sealing material. Further, an external terminal 19 is disposed on the element substrate 11.

In the first conventional example shown in FIG. 16, the wiring structure around the pixel section 4 is symmetrical with respect to top and down as well as right and left on the paper surface with the result that the steps of the sealing section are made uniform, thereby being capable of making an interval between the substrates uniform.

However, in the first conventional example, because the peripheral drive circuit is connected to the outside of the sealing material, there are a lot of wirings that are transverse to the sealing material, and moisture enters from the interfaces between the wirings which connect the drive circuit to the pixel section and the sealing material, resulting in such a problem that the liquid-crystal surface material is deteriorated. Also, because the peripheral drive circuit is disposed outside, the device is made large in size.

In order to eliminate those problems, the peripheral drive circuit integral type active matrix liquid-crystal display device in accordance with the second conventional example shown in FIG. 17 has a peripheral drive circuit disposed inside the sealing material region 17. Also, a one-side drive system is generally adopted without any provision of a redundant circuit. For that reason, as shown in FIG. 17, since wirings are transversal to the sealing material only on the right side and the lower side of the element substrate 11, the wiring structure has no symmetry with respect to top and down as well as right and left on the paper surface, the step of the sealing material on the peripheral drive circuit side is different from that of the sealing material on a wiring extending side. Hence, in bonding the substrates together, because no pressure is uniformly applied to the substrate, it is difficult to make an interval between the substrates uniform. As a result, nonuniformity occurs on display, or an image quality is deteriorated.

In particular, because the step of the sealing material on the peripheral drive circuit side is low, when bonding the substrates together, there may be a case in which the wirings are short-circuited between the top and the bottom in the peripheral drive circuit, thereby being liable to generate a line defect. Those problems lead to additional causes such as the deterioration of the yield of the peripheral drive circuit integral type liquid-crystal display device, or the lowering of the reliability.

Also, in the pixel element, a most projected portion is in a region where the scanning lines and the signal lines are superimposed one on another, and in the region, not only the scanning line, the signal line, an inter-layer insulation film for separating those lines from each other, but also a pixel electrode, a black matrix and so on are laminated one on another. In general, columnar fibers for maintaining the interval between the substrates are mixed with the sealing material. The dimensions of the fiber are set to values obtained by taking into consideration the margin in addition to the thickness of the projected portion in the pixel section and the dimensions of spacers dispersed inside the sealing material in such a manner that the step of the sealing material is higher in level than the pixel section. However, if the spacer is disposed on the projected portion of the pixel section, the pixel portion becomes higher than the sealing material, and when the substrates are bonded together under this state, the scanning lines and the signal lines are short-circuited between the top and the bottom through the spacers, thereby causing the point defect and the line defect.

SUMMARY OF THE INVENTION

The present invention has been made to eliminate the above problems with the conventional devices, and therefore an object of the present invention is to provide a peripheral drive circuit integral type liquid-crystal display device which is excellent in image quality and high in reliability.

In order to solve the above problems, according to the present invention, there is provided a liquid-crystal display device, comprising: an element substrate having a matrix circuit; an opposite substrate which is opposite to said element substrate; a sealing member for bonding said element substrate and said opposite substrate together; and substrate interval correction means having a laminate structure consisting of at least one layer and disposed in a region where said sealing material is formed.

Also, according to the present invention, there is provided a liquid-crystal display device, comprising: an element substrate matrix circuits having signal lines and scanning lines which are disposed in a matrix and separated from each other through a first interlayer insulation film, and pixel electrodes disposed on cross points of said signal lines and said scanning lines and separated from the signal lines through a second interlayer insulation film, and a peripheral drive circuit for controlling said matrix circuit; an opposite substrate which is opposite to said element substrate; a sealing material which surrounds said matrix circuit and bonds said element substrate and said opposite substrate together; and substrate interval correction means having at least first support means made of the same material as the signal lines, said first interlayer insulating film, second support means made of the same material as the signal lines, and a second interlayer insulation film formed in different layers from each other, in the formation region of said sealing material in said element substrate.

Further, according to the present invention, there is provided a liquid-crystal display device, comprising: an element substrate matrix circuits having signal lines and scanning lines which are disposed in a matrix and separated from each other through a first interlayer insulation film, pixel electrodes disposed on cross points of said signal lines and said scanning lines and separated from the signal lines through a second interlayer insulation film, and a thin-film transistor for operating the pixel electrode, and a peripheral drive circuit for controlling said matrix circuit; an opposite substrate which is opposite to said element substrate; a sealing material which surrounds said matrix circuit and bonds said element substrate and said opposite substrate together; and substrate interval correction means having at least support means made of the same material as the scanning lines, said first interlayer insulating film, and a second interlayer insulation film formed in different layers from each other, in the formation region of said sealing material in said element substrate.

The above and other objects and features of the present invention will be more apparent from the following description taken in conjunction with the accompanying drawings.

FIG. 1 is a front view showing the outline of an element substrate of an active matrix type liquid-crystal display device in accordance with embodiments of the present invention, in which peripheral drive circuits 103, 102 and a display section 102 are disposed on an element substrate 101.

As shown in FIG. 1, signal lines 105 and scanning lines 106 are transversal to a sealing material formation region 107 on the right and bottom sides of a paper surface, but those lines 105 and 106 are not transversal to the sealing material formation region 107 on the side of peripheral circuits 103 and 104. For that reason, in the present invention, there is formed substrate interval correction means that makes the step of the sealing material uniform.

FIG. 6 is a cross-sectional view showing substrate interval maintaining means taken along a width direction of the sealing material. As shown in FIG. 6, in the sealing material formation region, first support members 301, 302 and 303 made of the same material as that of the scanning lines 106, a first interlayer insulation layer 220 that separates the signal lines 105 from the scanning lines 106, and second support members 304 made of the same material as that of the signal lines 105 are laminated one on another. In particular, because it is designed that the second support members 304 do not exist on the first support members 301, 302 and 303, the cross-sectional structure of the substrate interval maintaining means along the edge portion of the sealing material formation region 107 is made uniform, thereby being capable of making the step of the sealing material uniform.

FIG. 15 is a cross-sectional view showing another substrate interval maintaining means taken along the width direction of the sealing material. As shown in FIG. 15, in the sealing material formation region 107, first support members 301, 302 and 303 made of the same material as that of the scanning lines 106, a first interlayer insulation layer 220 that separates the signal lines 105 from the scanning lines 106, and second support members 701 made of the same material as that of the signal lines 105 are laminated one on another. A region where the thickness of the matrix circuit is maximum is a region in which the signal lines 105 and the scanning lines 106 are superimposed one on the other. In the region, the signal lines, the interlayer insulation layer, the scanning lines and a passivation film are laminated one on another at least on the element substrate. Hence, in the present invention, the first support members 301, 302 and 303 and the second support members 701 are designed so as to be superimposed one on the other, thereby being capable of making the step of the substrate interval maintaining means nearly equal to the height of the region in which the thickness of the matrix circuit is maximum. Also, the step of the matrix circuit containing a spacer is made lower than the sealing material, thereby being capable of supporting a pressure required when bonding the substrates together by the sealing material. As a result, the spacer can prevent the scanning lines and the signal lines from being short-circuited between the upper and lower sides. It should be noted that because in the region where the signal lines 105 and the scanning lines 106 are superimposed one on the other, pixel electrodes, a black matrix and so on are further laminated one on another, the substrate interval formation means may be also designed so that the pixel electrodes, the black matrix and so on are laminated one on another in the formation means.

FIG. 4 is a top view showing the substrate interval correction means, in which linear first support members 301, 302 and 303 and second support members 304 are disposed alternately at regular intervals in the sealing material formation region 107.

The scanning lines extending from the matrix circuit are formed integrally with the first support members 302 in a region R3 transversal to the sealing material formation region 107 and extend to the outside of the sealing material formation region 107. On the other hand, the signal lines 305 that extend from the matrix circuit 102 are connected to the first support members 303 that are transversal to the sealing material formation region 107 inside the sealing material formation region 107.

As described above, according to the present invention, a wiring pattern which is transversal to the sealing material formation region 107 and electrically connected to an external circuit of the element substrate is made up of only the first support members 302 and 303, thereby making the step of the sealing material more uniform.

Also, as shown in FIG. 8, a wiring from the matrix circuit 102 or the peripheral circuits 103 and 104 is not transversal to the sealing material formation region 107 in the regions R1 and R2. The wiring is formed in the shape of a rectangular wave which is nearly equal to the width of the sealing material formation region 107 without disconnecting a first wiring layer 401. As a result, because the first wiring layer exists in an arbitrary cross-sectional structure in the width direction of the sealing material formation region 107, moisture can be prevented from entering from the exterior.

Also, in the present invention, the substrate interval maintaining means is so designed as to be formed together with a thin-film transistor that drives said pixel electrode, the first wiring layer is formed together with the signal lines, and the second wiring layer is formed together with the signal line.

DETAILED DESCRIPTION OF THE PREFERRED EMBODIMENTS

Now, a description will be given in more detail of embodiments of the present invention with reference to the accompanying drawings.

Figure 1:
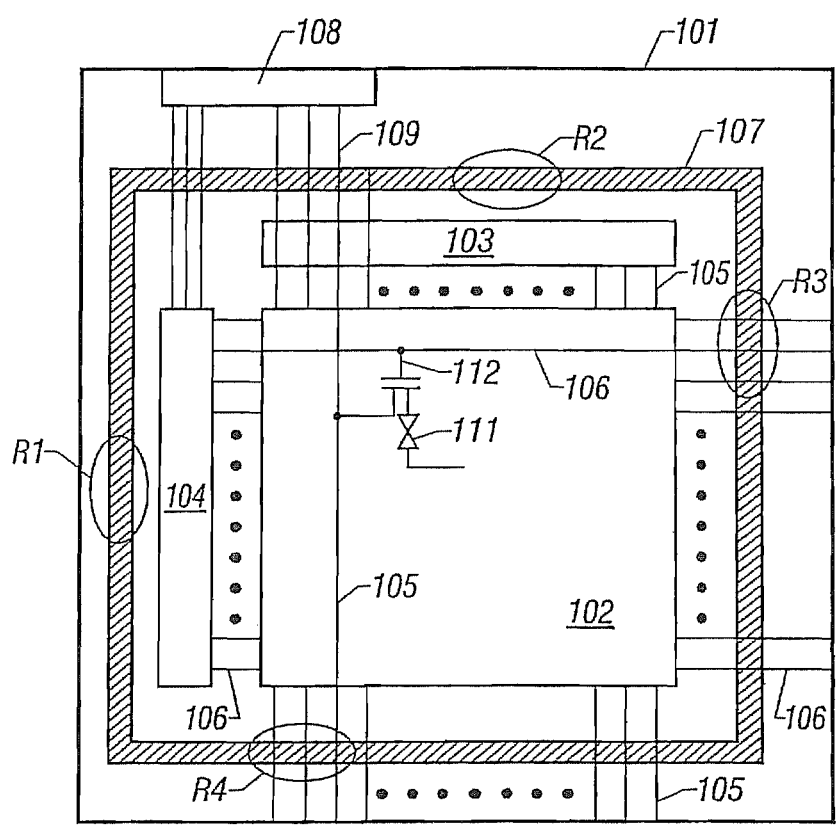
FIG. 1 is a top view showing a liquid-crystal display device in accordance with embodiments 1 to 5 of the present invention.

FIG. 1 is a front view showing an outline of an element substrate of an active matrix type liquid-crystal display device in accordance with embodiments 1 to 5 of the present invention, in which a peripheral drive circuit is integral with a display section. As shown in FIG. 1, a pixel section 102 is disposed on an element substrate 101 made of glass, quartz or the like, and a signal line drive circuit 103 is disposed on the top side in the periphery of the pixel section 102 whereas a scanning line drive circuit 104 is disposed on the left side. The signal line drive circuit 103 and the scanning line drive circuit 104 are connected to the pixel section 102 through the signal lines 105 and the scanning lines 106, respectively. The signal lines 105 and the scanning lines 106 form a lattice in the pixel section 102, and in the intersections thereof, liquid-crystal cells 111 and pixel TFTs 112 are connected in series, respectively. In the pixel TFTs 112, a gate electrode is connected to the signal lines 105, a source electrode is connected to the scanning lines 106, and a drain electrode is connected to an electrode of the liquid-crystal cell 111.

Furthermore, a sealing material region 107 is so arranged as to surround the pixel section 102, the signal line drive circuit 103, and the scanning line drive circuit 104. The element substrate 101 is bonded to an opposite substrate not shown through the sealing material formed in the sealing material region 107, and a liquid-crystal material is sealingly held between those substrates.

On the right and bottom sides of the paper surface, the signal lines 105 and the scanning lines 106 extend to the exterior of the sealing material formation region 107 so as to be connected to a control circuit outside of the panel, or the like. Furthermore, an external terminal 108 is disposed on the element substrate 101, and the external terminal 108 is connected with the signal line drive circuit 103 and the scanning line drive circuit 104 through wirings 109, respectively.

Embodiment 1

The active matrix liquid-crystal display device shown in FIG. 1 according to embodiment 1 is characterized in that, in order to make the step of the sealing material uniform, a wiring pattern (dummy wiring structure) which is shaped and substantially electrically insulated from a starting film of signal lines 103 and scanning lines 104 is disposed in a sealing material formation region 107 to make the structure of the lower portion of the sealing material uniform so that the step of the sealing material is unified. Also, in this embodiment, the above wiring pattern is fabricated together with TFTs disposed on the liquid-crystal panel.

A process of fabricating the active matrix liquid-crystal panel in accordance with this embodiment will be described with reference to FIGS. 2 to 6. FIG. 2 shows a cross-sectional view of a process of fabricating a TFT, in which the left side of FIG. 2 shows a process of fabricating a drive circuit TFT disposed in a peripheral drive circuit (a signal line drive circuit 203, a scanning line drive circuit 204), whereas the right side thereof shows a process of fabricating an pixel TFT disposed in a pixel section 202.

Figure 3:
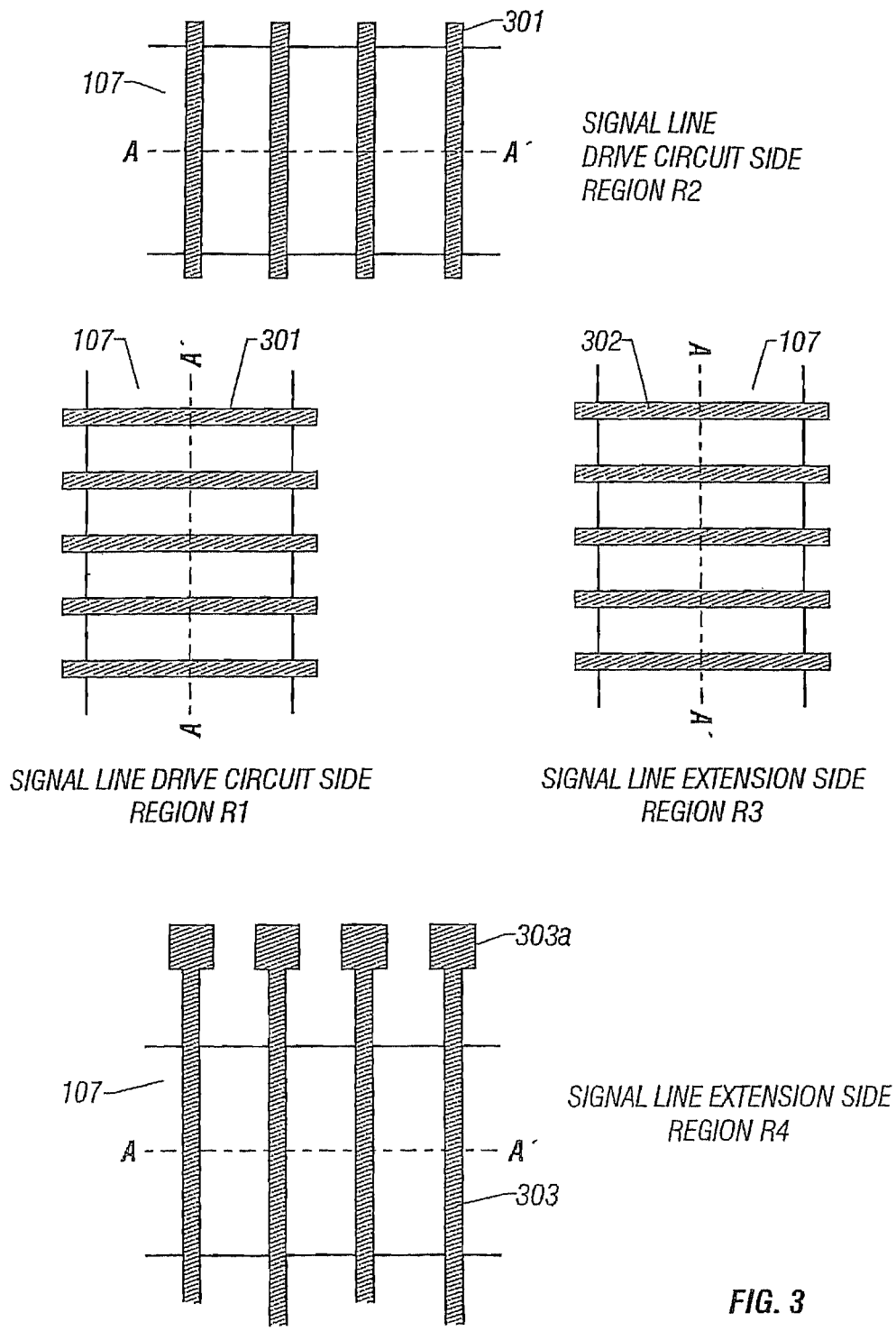
FIG. 3 is a diagram showing a process of fabricating the lower structure of a sealing material in accordance with embodiment 1.
Figure 4:
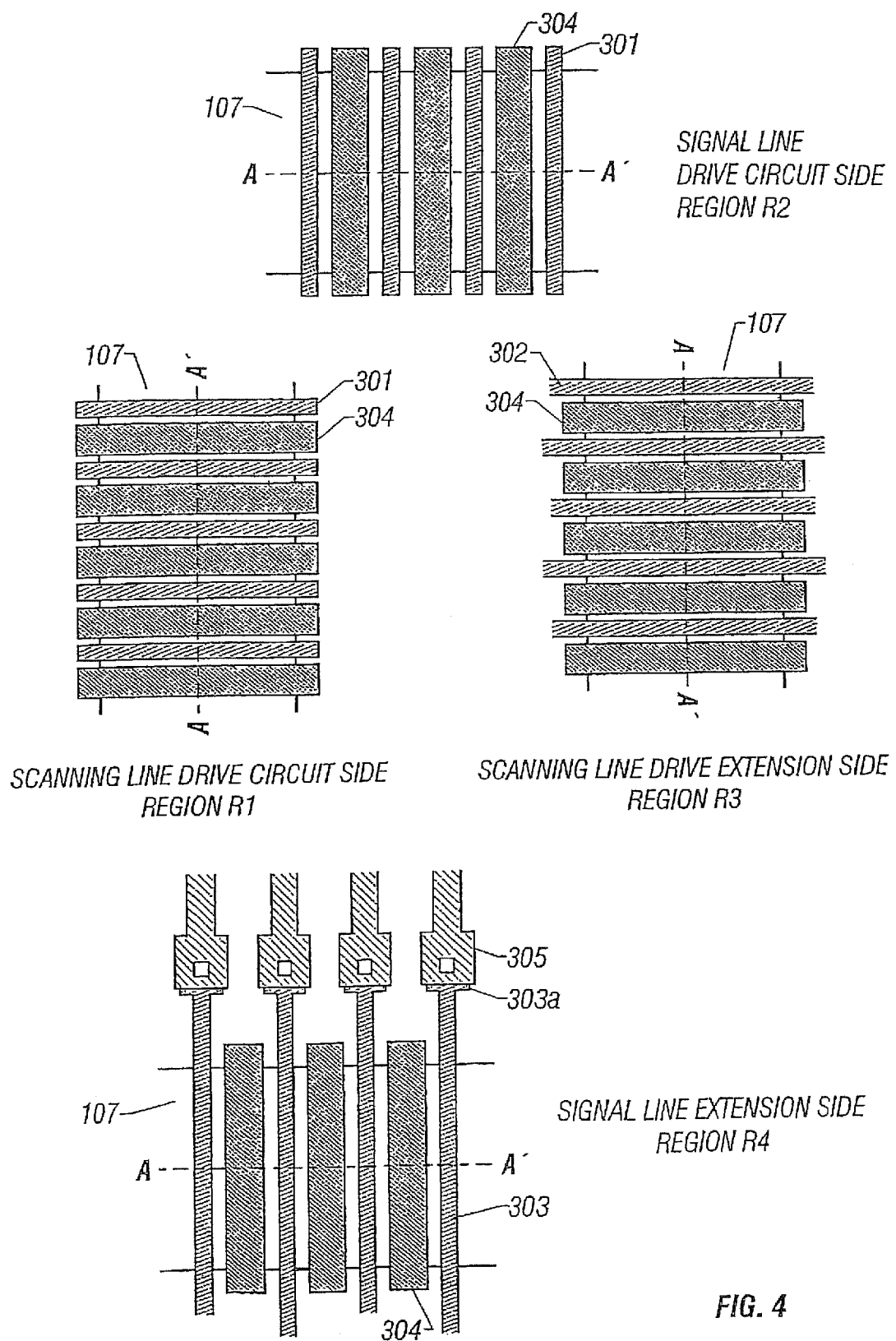
FIG. 4 is a diagram showing a process of fabricating the lower structure of a sealing material in accordance with embodiment 1.
Figure 5:
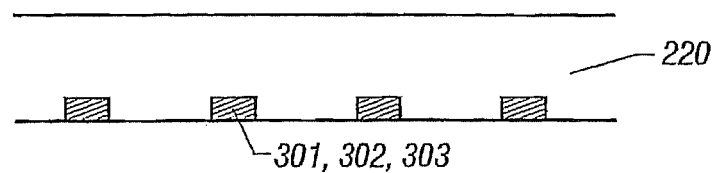
FIG. 5 is a cross-sectional view taken along a line A-A' in FIG. 4 and a cross-sectional view taken along a line B-B' in FIG. 7.
Figure 6:
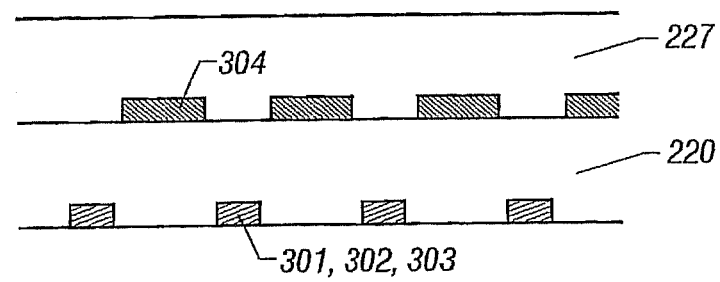
FIG. 6 is a cross-sectional view taken along a line A-A' in FIG. 4 and a cross-sectional view taken along a line B-B' in FIG. 8.

Also, FIGS. 3 to 6 show diagrams showing dummy wirings 301 for a first layer. FIGS. 3 and 4 show schematic top views of the sealing material formation region 107, which are enlarged diagrams of regions R1 to R4 indicated by ellipses in FIG. 1. Also, FIGS. 5 and 6 are cross-sectional views respectively taken along a line A-A' in FIGS. 3 and 4.

Figure 2A:
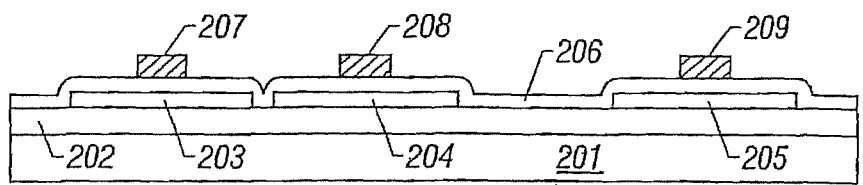
FIGS. 2A to 2E are diagrams showing a process of fabricating a TFT in accordance with embodiments 1 to 5.

In fabrication of the TFT, as shown in FIG. 2A, on a substrate 201 such as a quartz substrate or a glass substrate is formed a silicon oxide film 1000 to 3000 Å in thickness as a base oxide film 202. As a method of forming the silicon oxide film, a sputtering method or a plasma CVD method may be used in an oxide atmosphere.

Subsequently, an amorphous silicon film is formed in thickness of 300 to 1500 Å, preferably 500 to 1000 Å through the plasma CVD method or the LPCVD method. Then, the thermal annealing is conducted on the silicon film at a temperature of 500° C. or higher, preferably, 800 to 950° C., to thereby crystalize the silicon film. After the silicon film has been crystallized through the thermal annealing, the optical annealing may be conducted on the crystallized silicon film to further enhance crystallinity. Also, in crystallization of the silicon film through the thermal annealing, as disclosed in Japanese Patent Unexamined Publication Nos. Hei 6-244103 and Hei 6-244104, an element (catalytic element) such as nickel which promotes the crystallization of silicon may be added.

Then, the silicon film thus crystallized is etched to form active layers 203 (for a p-channel type TFT) and 204 (for an n-channel type TFT) of TFTs in an island-like peripheral drive circuit and an active layer 205 of TFTs (pixel TFTs) in the matrix circuit, respectively. Moreover, an oxide silicon 500 to 2000 Å in thickness is formed as a gate insulation film 206 through the sputtering method in an oxide atmosphere. As a method of forming the silicon oxide film, the plasma CVD method may be used. In the case of forming the silicon oxide film through the plasma CVD method, it is preferable that dinitrogen monoxide ($N_2O$) or oxygen ($O_2$) and monosilane ($SiH_4$) may be used as a raw gas.

Thereafter, a starting film of a wiring for the first layer is formed. In this embodiment, a polycrystalline silicon film (containing a small amount of phosphorus that enhances the electrically conductivity) 2000 Å to 5 μm, preferably 2000 to 6000 Å in thickness is formed on the overall surface of the substrate through the LPCVD method. Then, the polycrystalline silicon film thus formed is etched to form gate electrodes 207, 208 and 209 (FIG. 2A).

Furthermore, in this embodiment, the starting film of the wiring for the first layer is patterned even in the sealing material region 107 to form a wiring pattern as shown in FIG. 3, simultaneously when the gate electrodes 207 to 209 are formed.

Since it is unnecessary to form a wiring pattern which are transversal to the sealing material formation region 107 in the scanning line drive circuit side region R1 and the signal line drive circuit side region R2, linear dummy wirings 301 for the first layer are formed by patterning the silicon film in such a manner that it is disposed at regular intervals so as not to be electrically connected to each other.

In the scanning line extension side region R3, wirings 302 are formed so as to be transversal to the sealing material formation region 107. The wirings 302 correspond to the scanning lines 106 shown in FIG. 1 and are formed by the extensions of the gate electrodes 209 of the pixel TFTs.

In the signal line extension side region R4, wirings 303 are formed so as to be transversal to the sealing material formation region 107. In the end portions of the wirings 303 on the pixel section 102 side are formed connection end portions 303a for connecting with wirings extending from the pixel section 102 for the second layer.

It should be noted that the respective intervals between the dummy wirings 301 and the wirings 302, 303 are set to be identical with the intervals between the scanning lines 106, that is, to be substantially identical with the intervals between the pixels. In this embodiment, the respective intervals between the dummy wiring 301 for the first layer, the wiring 302 and the dummy wiring 301 for the first layer are set to about 50 μm, and their widths are set to about 10 μm.

Therefore, because the dummy wiring 301 for the first layer, the wiring 302 and the wiring 303 are disposed at regular intervals in the sealing material formation region 107 as shown in FIG. 5, the cross-sectional structure of the sealing material formation region 107 can be unified.

It should be noted that the material of the starting films of the gate electrodes 207 to 209, the dummy wirings 301, the wirings 302 and 303 for the first layer is not limited to a silicon film, and the material of the gate electrode which is usually used may be used therefor. For example, silicide, or aluminum, tantalum, chromium, molybdenum or the like which is an anodizable material may be used.

Figure 2B:
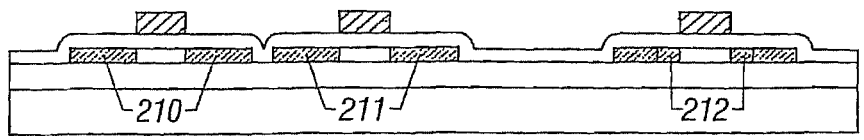

Subsequently, as shown in FIG. 2B, phosphorus is injected into all the island-like active layers 203 to 205 with a doping gas of phosphine ($PH_3$) in the self-alignment manner, using the gate electrodes 207 to 209 as a mask, through the ion doping method. The dose amount is set to $1\times10^{12}$ to $5\times10^{13}$ atoms/cm². As a result, weak n-type regions 210, 211 and 212 are formed.

Then, while a mask 213 made of photoresist which covers the active layer 203 of the p-channel type TFT is being formed, a mask 214 made of photoresist which covers the end of the gate electrode 209 to a portion apart from the end thereof by 3 μm in parallel with the gate electrode 209 in the active layer 205 of the pixel TFTs is formed. Then, phosphorus is again injected into the active layers with a doping gas of phosphine through the ion doping method. The dose amount is set to $1\times10^{14}$ to $5\times10^{15}$ atoms/cm². As a result, strong n-type regions (source/drain) 215 and 216 are formed. In the weak n-type regions 212 in the active layer 205 of the pixel TFTs, since phosphorus is not injected into regions 217 which have been covered with the mask 214 at this doping, it remains weak n-type (FIG. 2C).

Figure 2C:
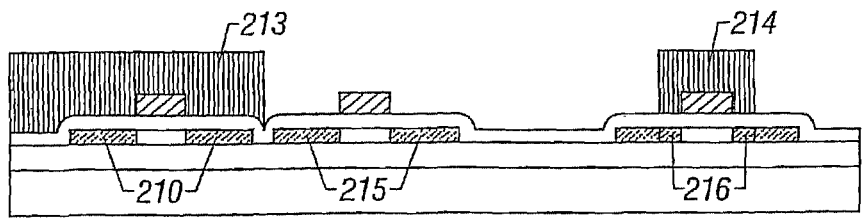
Figure 2D:
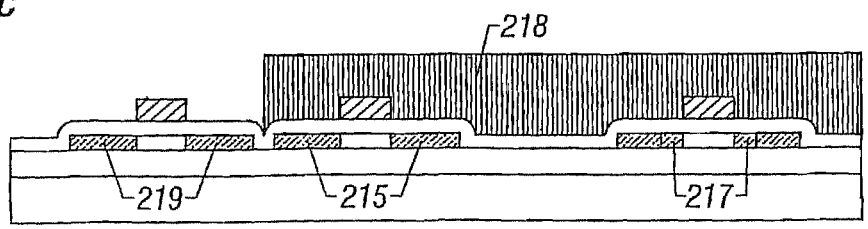

Subsequently, the active layers 204 and 205 of the n-channel type TFT shown in FIG. 2D are covered with a mask 218 made of photoresist, and boron is injected into the island-like region 103 with a doping gas of diborane ($B_2H_6$) through the ion doping method. The dose amount is set to $5\times10^{14}$ to $8\times10^{15}$ atoms/cm². In this doping, because the dose amount of boron exceeds the dose amount of phosphorus in FIG. 2C, the weak n-type region (a low-density impurity region) 210 is reverted to a strong p-type region 219.

The strong n-type regions (source/drain) 215, 216, the strong p-type region (source/drain) 219 and the weak n-type region (a low-density impurity region) 217 are formed through the doping process shown in FIGS. 2B to 2D. In this embodiment, the width x of the low-density impurity region 217 is set to about 3 μm.

Thereafter, thermal annealing is conducted on the doped regions at 450 to 850° C. for 0.5 to 3 hours, to thereby recover the regions damaged by doping. As a result, the doping impurities are activated, and the crystallinity of silicon is recovered.

Figure 2E:
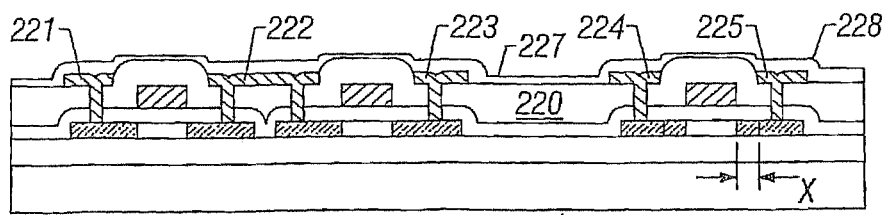

Thereafter, as shown in FIGS. 2E and 5, a silicon oxide film 3000 to 6000 Å in thickness is formed on the entire surface of the substrate as an interlayer insulator 220 through the plasma CVD method. In this embodiment, the thickness of the interlayer insulator 220 is set to 4000 Å. It should be noted that the interlayer insulator 220 may be made up of a single-layer film consisting of a silicon nitride film, or a multi-layer film consisting of a silicon oxide film and a silicon nitride film. The interlayer insulator 220 is etched to form sources/drains 219, 215 and 216 as well as contact holes for connection end portions 303a of the wirings 303 shown in FIG. 3.

Then, the starting film of the wiring and electrodes for the second layer is formed. In this embodiment, a titanium film 1000 Å in thickness, an aluminum film 2000 Å in thickness, and a titanium film 1000 Å in thickness are continuously formed through the sputtering method. The three-layer film is etched so that while electrodes/wirings 221, 522 and 523 of the peripheral circuits and electrode/wiring 224 and 225 of the pixel TFT are formed, dummy wirings 304 for the second layer which are not electrically connected to the sealing material formation region 107 are formed as shown in FIGS. 4 and 6. It should be noted that FIG. 6 is a cross-sectional view taking along a line A-A' in the regions R1 to R4 of FIG. 4.

As shown in FIG. 4, the dummy wirings 304 for the second layer are disposed uniformly at the respective gaps defined between the dummy wirings 301, the wirings 302 and the wirings 303 for the first layer which are formed of the starting film (silicon film) of the electrodes and the wirings for the first layer. For that reason, as shown in FIG. 6, the lower structure of the sealing material formation region 107 can be unified. It should be noted that the dummy wirings 304 are formed so that one wiring is divided in the scanning line drive circuit side region R1 and the scanning line extension line side region R3, and likewise so that one wiring is divided in the signal line drive circuit side region R2 and the signal line extension line side region R4.

Further, in this embodiment, as shown in FIG. 3, or connection with an external circuit of the element substrate 101 or an external terminal, wiring patterns (the wirings 302 and the wirings 303) which are transversal to the sealing material formation region 107 are designed so as to be formed of the starting film of the wiring for the first layer, and the wirings for the second layer are designed so as not to extend to the exterior of the sealing material formation region 107, whereby the step of the lower structure in the sealing material formation region 107 is more unified.

Hence, in order to allow the pixel section 102 to be connected to another circuit at the exterior of the panel in the signal line extension side region R4, in patterning the starting film (titanium/aluminum/titanium film) of the electrode and the wiring for the second layer, there are formed the wirings 305 which are connected to the wirings 303 at the connection end portions 303a thereof. The wirings 303 and the wirings 305 enable the pixel section 102 to be connected to another circuit at the exterior of the panel.

It should be noted that the pitch of the dummy wirings 304 for the second layer is set to the pitch of the scanning lines 106, that is, the former is made identical with the pitch of the wirings 305, and the width of the dummy wirings 304 for the second layer is set to 30 μm. Because the respective intervals between the dummy wirings 301, the wirings 302 and the wirings 303 for the first layer are set to about 50 μm, the intervals between the end surfaces of the dummy wirings 304 for the second layer and the end surfaces of the dummy wiring 301, the wirings 302 and the wirings 303 for the first layer are about 10 μm.

Then, after the starting film (titanium/aluminum/titanium film) of the electrodes/wirings for the second layer has been patterned, a silicon nitride film 1000 to 3000 Å in thickness is formed as a passivation film 226 through the plasma CVD method as shown in FIGS. 2E and 6.

As shown in FIG. 6, in the sealing material formation region 107, the dummy wirings 304 for the second layer are disposed on the interlayer insulation film 220 at regular intervals in a region where the dummy wirings 301, and the wirings 302, 303 for the first layer are not formed, thereby being capable of making identical the cross-sectional structure taken along the line A-A' in FIG. 4, that is, the cross-sectional structure along the outer periphery of the sealing material formation region 107. Then, a passivation film 227 is formed on the surface of the dummy wirings 304 for the second layer, thereby being capable of flattening the surface of the sealing material formation region 107.

It should be noted that in order to make the cross-sectional structure along the outer periphery of the sealing material formation region 107 identical, only the dummy wirings 301, the wirings 302 and the wirings 303 which are formed of the starting film of the electrodes/wirings for the first layer may be disposed. In comparison with the respective intervals between those wirings 301 to 303 being about 50 μm, their widths are small to about 10 μm. As a result, because their strength cannot be compensated, the dummy wirings 304 for the second layer are formed so that the lower structure of the sealing material is reinforced.

Further, in this embodiment, for the purpose of making the step of the lower structure in the sealing material formation region 107 uniform, it is important that the dummy wirings 304 for the second layer are prevented from being superimposed on the dummy wirings 301, the wirings 302 and the wirings 303 for the first layer. If the intervals between the end surfaces are about 10 μm, the dummy wirings 304 for the second layer are prevented from being superimposed on the dummy wirings 301, the wirings 302 and the wirings 303 for the first layer, even though taking into consideration an error in alignment of the mask, or the like.

In this embodiment, the dummy wirings 301 and 304 are formed so as to be longer than the width of the sealing material formation region 107, however, the dummy wirings 301 and 304 may be formed so as not to be projected from the sealing material formation region 107.

It should be noted that the structure of the wiring pattern 109 which is connected with the external terminal 108 may be identical with the structure of the wirings 301 and 305 which are disposed in the signal line extension side region R4. The wiring pattern which is transversal to the sealing material formation region is formed of the starting film of the wirings for the first layer. Then, the wiring pattern which is connected to the wiring pattern for the first layer is formed of the starting film of the wirings for the second layer so as to be connected with the signal line drive circuit 103, the scanning line drive circuit 104 and the external terminal 109.

The passivation film 227 is etched to form contact holes that reach the electrode 225 of the pixel TFT. Finally, an ITO (an indium tin oxide) film 500 to 1500 Å in thickness, which is foamed through the sputtering method, is etched to form a pixel electrode 228. In this manner, the peripheral logic circuits and the active matrix circuit are formed integrally (FIG. 2E).

Hereinafter, a process of assembling the active matrix liquid-crystal display panel will be described.

The TFT substrate 101 obtained through the process shown in FIGS. 2 to 6, and a color filter substrate are satisfactorily cleaned of a variety of chemicals such as an etching liquid or a resist separation liquid which have been used for processing the surface, respectively.

Then, oriented films are allowed to stick to the color filter substrate and the TFT substrate. The oriented film has a constant groove cut, and liquid-crystal moleculars are arranged uniformly along the groove. The oriented film material as used is what is obtained by solving polyimide of about 10 wt % in solvent of butyl cellosolve or n-methyl pyrolidone. This is called "polyimide varnish". The polyimide varnish is printed by a flexographic press.

The oriented films which stick to both of the TFT substrate and the color filter substrate are heated and hardened. This is called "bake". The bake is to feed heat air of about 300° C. at the highest use temperature for heating to bake and harden polyimide vanish.

Subsequently, the surface of the glass substrate to which the oriented film sticks is subjected to a rubbing process through which the surface is rubbed with a buff cloth (fabric made of rayon, nylon or the like) 2 to 3 mm in the length of hairs in a given direction to form fine grooves.

Then, spherical spacers of the polymer base, glass base or silica base are dispersed on any one of the TFT substrate and the color filter substrate. As the system of dispersing the spacers, there are the wet system in which spacers are mixed with solvent such as pure water or alcohol and then dispersed on the glass substrate, and the dry system in which spacers are dispersed on the glass substrate without any use of the solvent.

Thereafter, a sealing material is coated on the outer frame of the TFT substrate 101. The coating of the sealing material serves to bond the TFT substrate to the color filter substrate, and to prevent injected liquid-crystal material from flowing externally. The sealing material as used is what is obtained by solving an epoxy resin and a phenol hardener in solvent of ethyl cellosolve. After the coating of the sealing material, two glass substrates are stuck together. The method of sticking those glass substrates together is a heat hardening system of hardening the sealing material for about 3 hours by pressing at a high temperature of 160° C.

A liquid-crystal material is inserted into the active matrix liquid-crystal display device which is obtained by sticking the element substrate and the color filter substrate together from a liquid-crystal injection inlet thereof, and after the injection of the liquid-crystal material, the liquid-crystal injection inlet is sealed with an epoxy resin. In the above manner, the active matrix liquid-crystal display device is assembled.

Embodiment 2

Embodiment 2 is a modified example of embodiment 1, and relates to the dummy wirings for the first layer in region to which the wiring of the sealing material formation region 107 is not transversal in the liquid-crystal panel shown in FIG. 1.

In embodiment 1, because linear dummy wirings 301 for the first layer and the linear dummy wirings 304 for the second layer are alternately arranged, patterning is facilitated. However, because the wiring pattern is so arranged as to be transversal to the sealing material formation region 107, moisture is liable to enter from the interfaces between the wirings, the interlayer insulation film 220 and the passivation film 227. In this embodiment, in the sealing material formation region 107, as in the wirings 302 and 303 shown in FIG. 4, the dummy wirings 301 for the first layer are formed without any disconnection in a region to which the wirings for electrically connecting the pixel section 102, the drive circuits 103 and 104 to the circuit external to the sealing material are not transversal, thereby preventing moisture from entering from the external.

Figure 7:
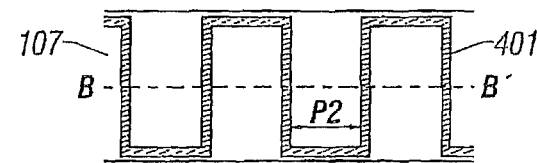
FIG. 7 is a diagram showing a process of fabricating a substrate interval correction means in accordance with embodiment 2.
Figure 7:
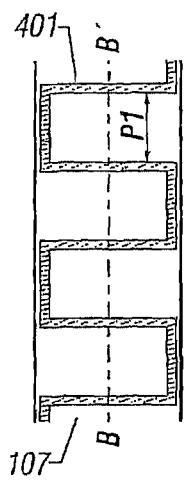
Figure 7:
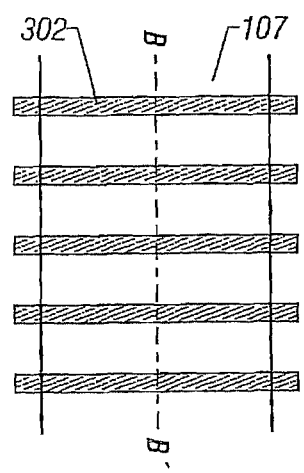
Figure 7:
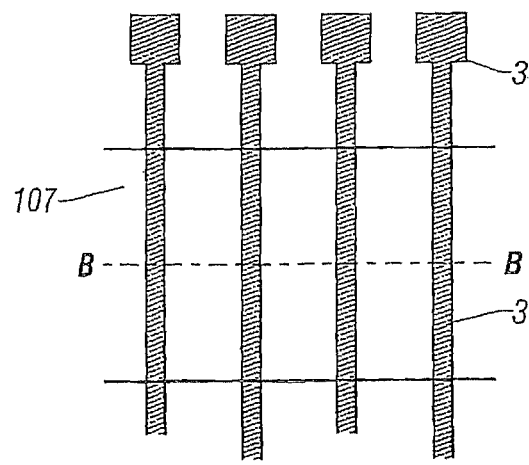
Figure 8:
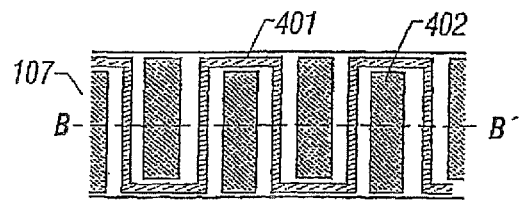
FIG. 8 is a diagram showing a process of fabricating the substrate interval correction means in accordance with embodiment 2.
Figure 8:
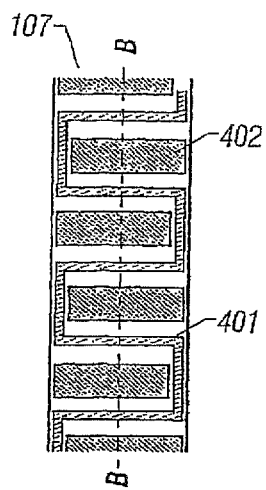
Figure 8:
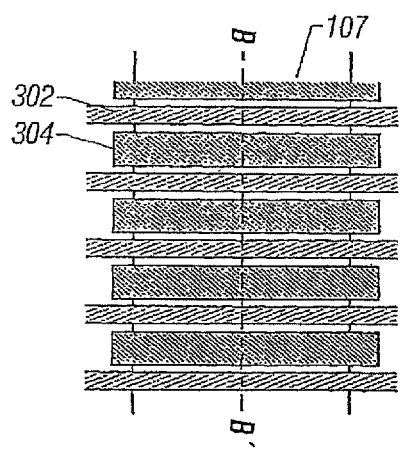
Figure 8:
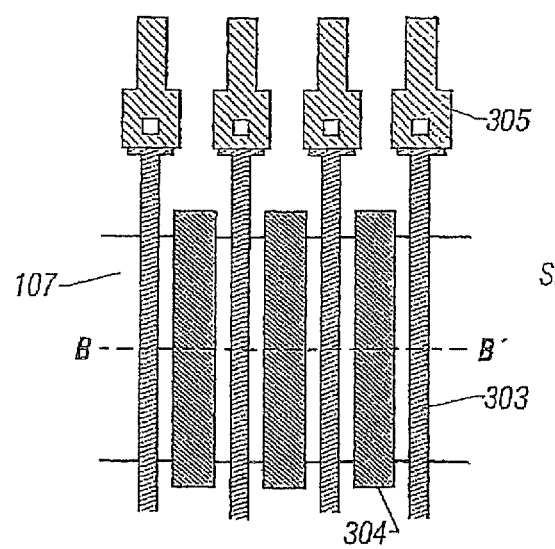

FIGS. 7 and 8 are diagrams showing a process of fabricating the lower structure of the sealing material in accordance with this embodiment, and FIGS. 7 and 8 are schematic top views of the sealing material formation region 107, and enlarged diagrams of R1 to R4 Is indicated by ellipses in FIG. 1.

In this embodiment, the dummy wirings are fabricated together with the TFT as in embodiment 1. Also, such a region that electrically connected wiring is transversal to the sealing material formation region 107, that is, the scanning line extension side region R3 and the signal line extension side region R4, and the wiring pattern 109 connected to the external terminal 108 are identical in structure with that of embodiment 1. Hereinafter, a process of fabricating the dummy wiring 401 for the first layer which is not electrically connected to the sealing material formation region 107 will be described with reference to FIGS. 7 and 8.

A starting film such as an aluminum film which forms the electrode/wiring for the first layer is formed in thickness of, for example, 3000 Å. As shown in FIG. 7, the starting film is patterned so that while the gate electrode/wiring of a TFT is formed, rectangular wave shaped dummy wirings 401 for the first layer are formed in a scanning line drive circuit side region R1 and a signal line drive circuit side region R2. In the scanning line drive circuit side region R1 and the signal line drive circuit side region R2, the pitches P1 and P2 of the dummy wirings 401 for the first layer are set to be equal to the pitch of the scanning lines 106 and the signal lines 105, and in this embodiment, it is set to about 50 μm, and the width of the dummy wirings 401 for the first layer is set to 10 μm. Also, the dummy wirings 401 for the first layer are designed so as not to project from the sealing material formation region 107.

The cross-sectional view taken along a line B-B' in FIG. 7 corresponds to FIG. 5. As shown in FIG. 5, in this embodiment, because the dummy wirings 401, the wirings 302 and 303 for the first layer are disposed at regular intervals in the sealing material formation region 107, the cross-sectional structure of the sealing material formation region 107 can be unified.

Under that state, the cross-sectional structure along the outer periphery of the sealing material formation region 107 can be made identical. However, in comparison with the respective intervals between the dummy wirings 401 for the first layer which are formed of the starting film of the wirings for the first layer being about 50 μm, their widths are small to about 10 μm. As a result, because their strength cannot be compensated, the dummy wirings 402 are formed on the interlayer insulator 220 so that the lower structure of the sealing material is reinforced.

After the interlayer insulator 220 is formed in thickness of about 4000 Å, a titanium film, a laminate film consisting of titanium and aluminum, or the like are formed in thickness of 4000 Å as a starting film of the electrodes/wirings for the second layer. The starting film is so patterned as to form the source/drain electrodes/wirings of a TFT, and also to form the linear dummy wirings 402 for the second layer at the regular intervals as shown in FIG. 8. The dummy wirings 402 for the second layer are formed in such a manner that they embed a region in which the dummy wirings 401 for the first layer are not formed and also that they are prevented from being superimposed on the dummy wirings 401 for the first layer. Thereafter, after the starting film (titanium/aluminum/titanium film) of the electrodes/wirings for the second layer has been patterned, a silicon nitride film 1000 to 3000 Å in thickness is formed as a passivation film 226. It should be noted that the cross-sectional view taken along the line B-B' in FIG. 8 corresponds to FIG. 6.

As shown in FIG. 8, in this embodiment, in the sealing material formation region 107, the dummy wirings 402 for the second layer are disposed on the interlayer insulation film 220 at regular intervals in a region where the dummy wirings 401 are not formed, thereby being capable of making identical the cross-sectional structure taken along the outer periphery of the sealing material formation region 107 shown in FIG. 6. Further, a passivation film 227 is formed on the surface of the dummy wirings 304 for the second layer, thereby being capable of flattening the surface of the sealing material formation region 107.

In particular, for the purpose of making the step of the lower structure in the sealing material formation region 107 uniform, it is important that the dummy wirings 402 for the second layer are prevented from being superimposed on the dummy wirings 401 for the first layer. If the intervals between the end surfaces are about 10 µm, the dummy wirings 401 are prevented from being superimposed on the dummy wirings 402 even though taking into consideration an error in alignment of the mask, or the like.

In this embodiment, because the dummy wirings 401 which are not disconnected are formed in the region to which the wirings are not transversal, particularly the regions R1 and R2 in the sealing material formation region 107, the dummy wirings 401 always exist in the cross-sectional structure which is transversal to the sealing material formation region 107 (cross-sectional structure along a line orthogonal to the line B-B'), thereby being capable of prevention moisture from entering from the exterior.

Embodiment 3

Embodiment 3 is an modified example of the wiring pattern for the first layer in embodiment 1, in which only one layer of the wiring pattern is disposed in the sealing material formation region 107. In embodiment 1, because the dummy wirings 301 for the first layer and the dummy wirings 304 for the second layer are alternately arranged, patterning is facilitated. However, as shown in the cross-sectional view of FIG. 6, moisture is liable to enter from the interfaces between the dummy wirings 301 for the first layer, the dummy wirings 304 for the second layer, the interlayer insulation film 220 and the passivation film 227. In this embodiment, in order to prevent moisture from entering, the shape of the wirings for the first layer in the sealing material formation region 107 is devised.

Figure 9:
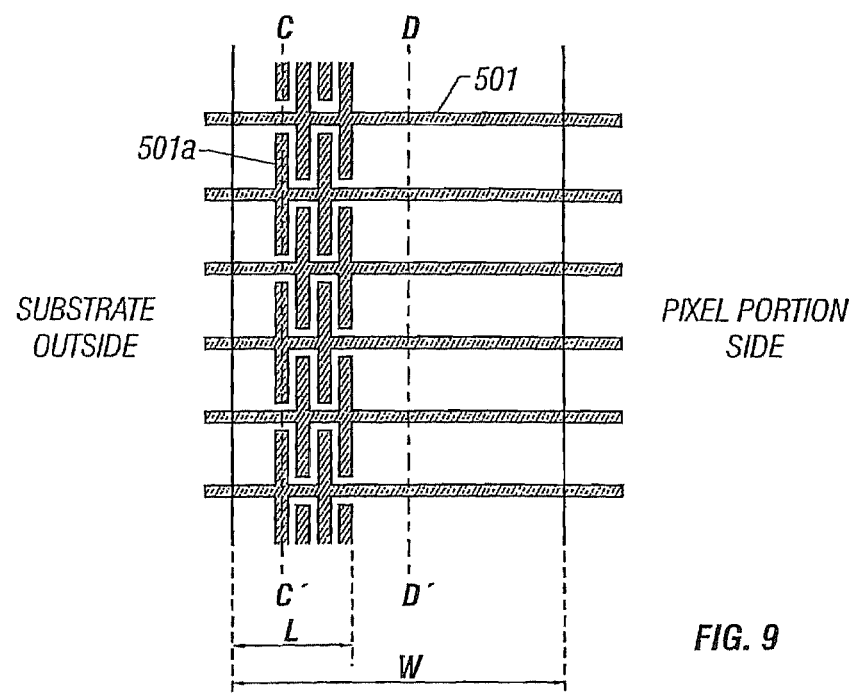
FIG. 9 is a diagram showing a process of fabricating the substrate interval correction means in accordance with embodiment 3.
Figure 10:
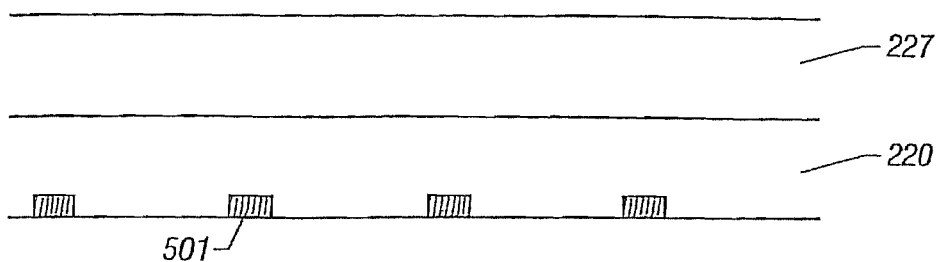
FIG. 10 is a cross-sectional view taken along a line D-D' in FIG. 9.
Figure 11:
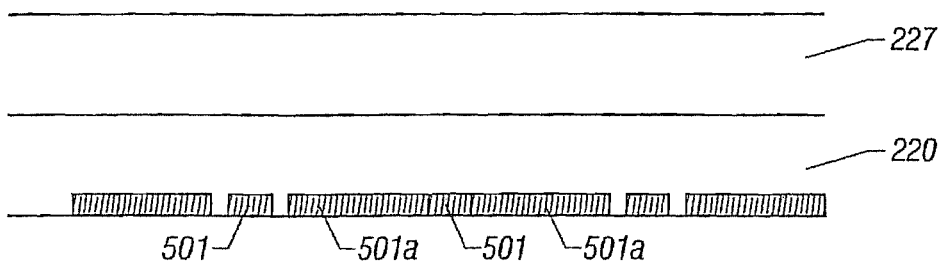
FIG. 11 is a cross-sectional view taken along a line C-C' in FIG. 9.

FIG. 9 is a top view of the sealing material formation region 107 in accordance with this embodiment, and shows an enlarged diagram showing the vicinity of the scanning line drive circuit side region R1 and the signal line drive circuit side region R2. FIG. 10 is a cross-sectional view taken along a dotted line D-D' in FIG. 9, and FIG. 11 is a cross-sectional view taken along a dotted line C-C' in FIG. 9. Also, the dummy wirings of the lower portion in the sealing material in this embodiment are fabricated together with a TFT as in embodiment 1.

A starting film such as an aluminum film which forms the electrode/wiring for the first layer is formed in thickness of, for example, 3000 Å. The starting film is patterned so that while the gate electrode/wiring of a TFT are formed, dummy wirings 501 which are not electrically connected are formed as shown in FIG. 9. On the surface, as shown in FIGS. 10 and 11, an interlayer insulator 220 and a passivation film 227 are laminated one on the other sequentially in accordance with a process of fabricating the TFT. It should be noted that the wiring pattern made up of the starting film of the electrode/wiring for the second film may be formed on interlayer insulation film 220 so as not to be superimposed on the dummy wiring 501 as in embodiments 1 and 2.

Branches 501a orthogonal to the longitudinal direction of the dummy wirings 501 are formed at regular intervals at the outer edge side of the sealing material formation region 107 of the dummy wiring 501. Those branches 501a alternates with the branches 501a of the adjacent dummy wirings 501 so as to embed the gaps between the dummy wirings 501. Hence, because the dummy wirings 501 always exist in an arbitrary cross-sectional view which is transversal to the sealing material formation region 107 (the cross-sectional structure along a line orthogonal to the line C-C'), moisture can be prevented from entering from the exterior.

In order to prevent moisture from entering from the exterior, because the width W of the sealing material formation region 107 is about several mm, the length L of a region in which the branches 501a are formed may be set to about 100 to 500 µm. Also, the pitch of the dummy wirings 501 is made identical with the pitch of the pixels, and in a portion in which the branches 501a are formed, the minimum value of the intervals between the end surfaces of the adjacent dummy wirings 501 is preferably set to about 5 to 10 µm in order to prevent short-circuiting between the wirings.

It should be noted that in this embodiment, only the dummy wirings 501 formed in the scanning line drive circuit side region R1 and signal line drive circuit side region R2 was described. In the scanning line extension side region R3, the dummy wirings 501 are formed so as to be transversal to the sealing material formation region 107 and extend to the pixel side and the outside of the substrate, respectively. Also, in the signal line extension side region R4, the dummy wirings 501 are so designed as to extend the outside of the substrate so that the connection end portions may be formed oil the pixel side as the wirings 303 shown in FIG. 3.

As a result, because the wiring patterns having the branches 501a are arranged uniformly on the outer edge portion, side of the sealing material formation region 107, the lower structure of the sealing material disposed in the sealing material formation region 107 shown in FIG. 1 can be made symmetrical with respect to top and bottom as well as right and left on the paper surface. As a result, a pressure can be uniformly applied to the substrate when the substrates stick to each other.

It should be noted that in embodiments 1 to 3, the uppermost layer of the substrate interval correction means disposed in the sealing material formation region 107 is formed of the passivation film 227. Alternatively, the pixel electrodes 228, a black matrix and so on may be further formed on the surface of the passivation film 227 in accordance with the process of fabricating the pixel section 102.

Embodiment 4

Figure 12:
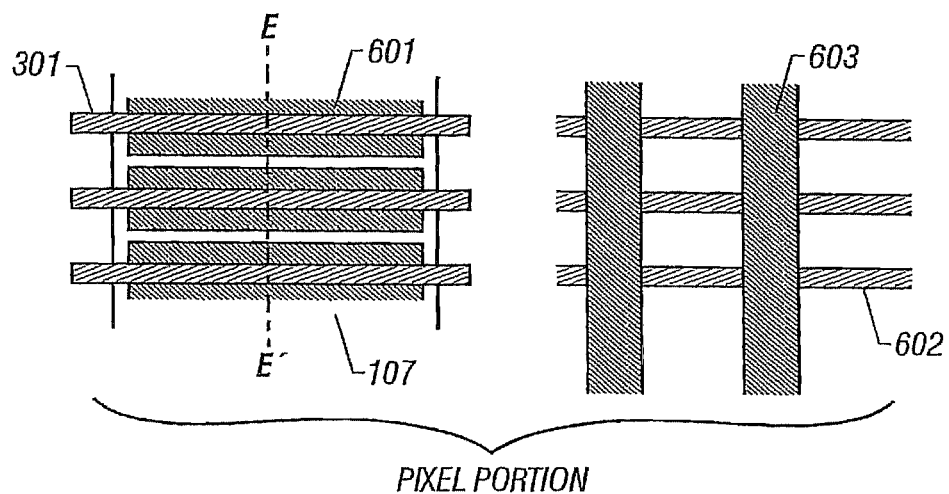
FIG. 12 is a top view showing a substrate interval correction means in accordance with embodiment 4.
Figure 13:
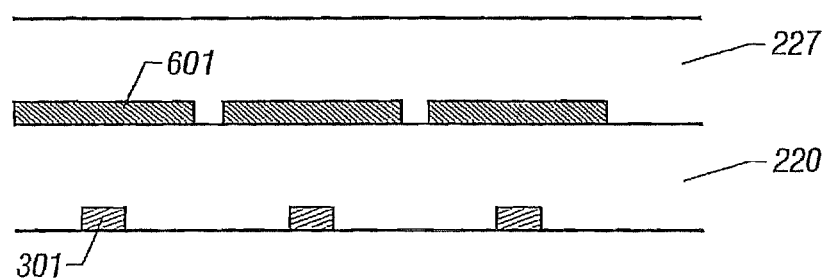
FIG. 13 is a cross-sectional view taken along the line E-E' in FIG. 12.

In embodiments 1 and 2, in order to make the lower structure of the sealing material uniform, the end surfaces of the wirings for the first layer are so designed as not to be superimposed on the end surfaces of the wirings for the second layer in the sealing material formation region. In embodiment 4, the end surfaces of the wirings for the first layer are superimposed on the end surfaces of the wirings for the second layer so that the step formed between the sealing material and the pixel section is made small. FIG. 12 is a top view of a substrate interval correction means in accordance with this embodiment, showing only a region of the scanning line drive circuit side or the signal line drive circuit side. Also, FIG. 13 is a cross-sectional view taken along a line E-E' in FIG. 12.

This embodiment is a modified example of the dummy wirings 304 for the second layer in embodiment 1 shown in FIGS. 4 and 6. In the sealing material formation region is first formed the linear dummy wirings for the first layer from the starting film of the scanning lines 602. Then, after the formation of the interlayer insulator 220, the starting film of the signal lines 603 is patterned so as to form the dummy wiring 601 for the second layer. The dummy wirings 601 are so formed at regular intervals as to be superimposed on the dummy wirings 301 for the first layer and also to embed a region in which no dummy wiring 301 is formed.

As a result, since the lower structure of the sealing material can be unified, a pressure can be uniformly applied to the sealing material when the substrates stick to each other. Further, convex portions having nearly the same step as that of a portion where the scanning lines 602 and the signal lines 603 are superimposed one on another are disposed at regular intervals in the sealing material formation region. Hence, since a pressure under which the substrates are stuck together is supported in the convex portion of the sealing formation region, the spacers can prevent the scanning lines 602 and the signal lines 603 from being short-circuited between the top and the bottom.

It should be noted that in this embodiment, the dummy wirings 601 for the second layer are set to be shorter than the width of the sealing material formation region 107, however, they may be set to be longer than the width of the sealing material formation region 107.

Embodiment 5

Figure 14:
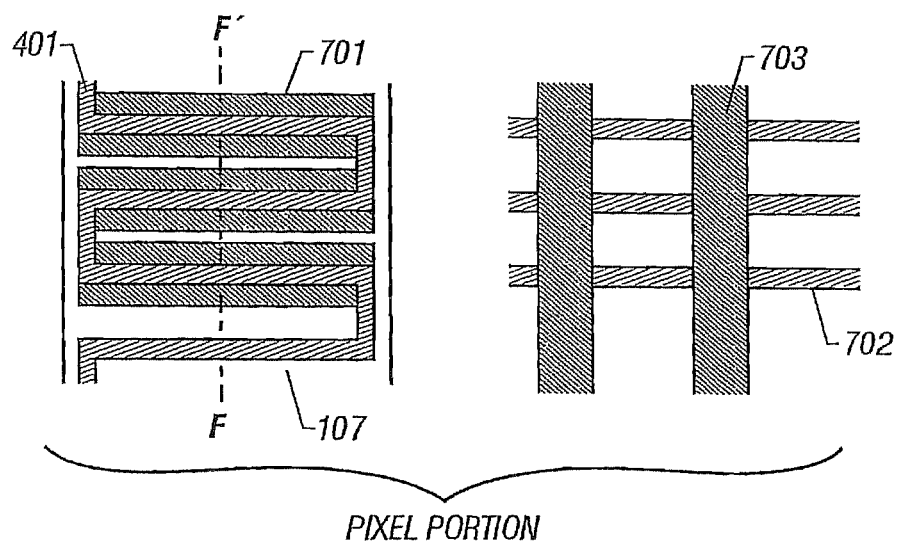
FIG. 14 is a top view showing a substrate interval correction means in accordance with embodiment 5.
Figure 15:
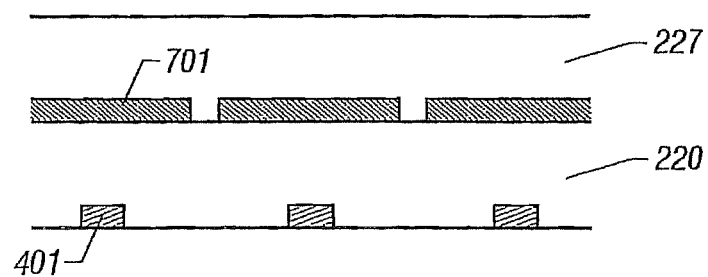
FIG. 15 is a cross-sectional view taken along the line F-F' in FIG. 14.
Figure 16:
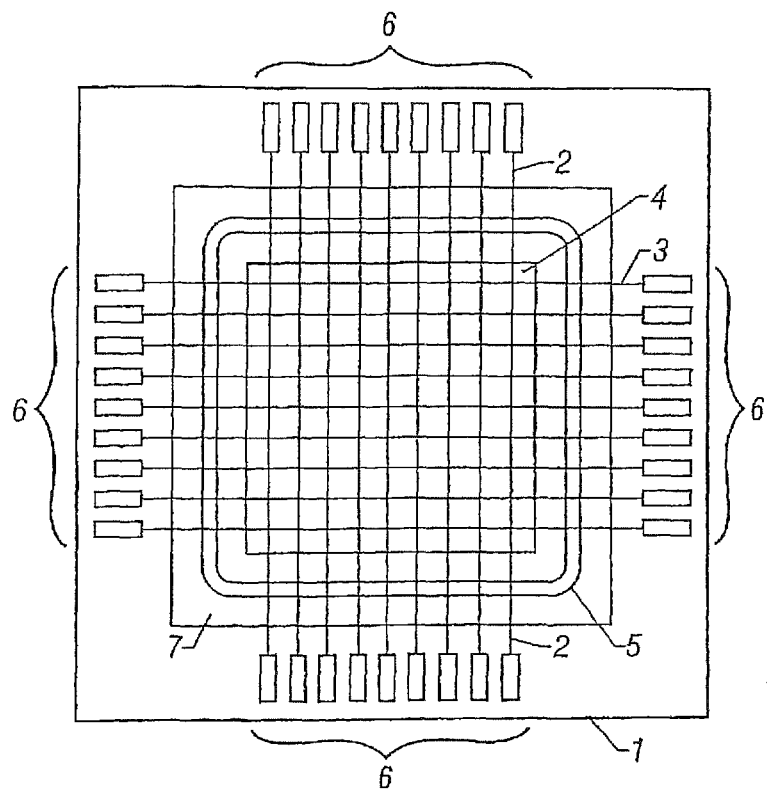
FIG. 16 is a top view showing a liquid-crystal display device in accordance with conventional example 1.
Figure 17:
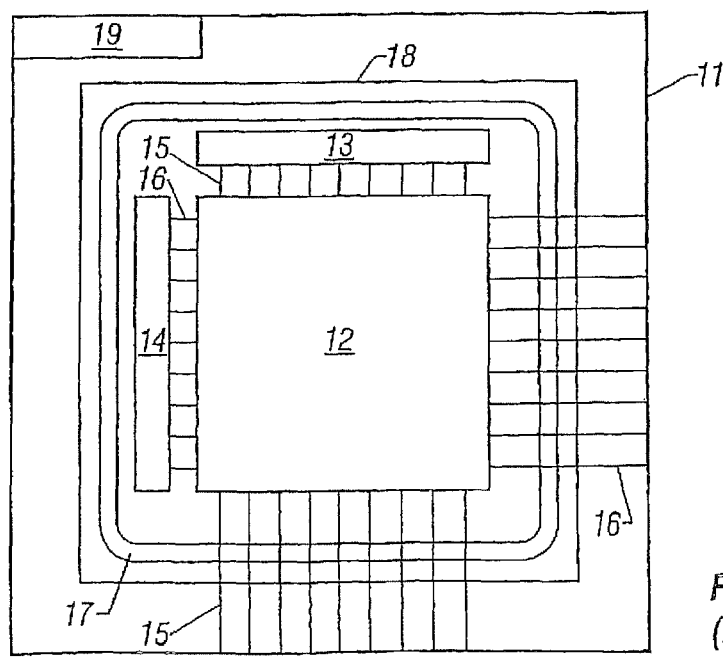
FIG. 17 is a top view showing a liquid-crystal display device in accordance with conventional example 2.

In embodiment 5, the end surfaces of the wirings for the first layer are superimposed on the end surfaces of the wirings for the second layer so that the step between the sealing material and the pixel section is made small. FIG. 14 is a top view of a substrate interval correction means in accordance with this embodiment, showing only the region of the scanning line drive circuit side or the signal line drive circuit side. Also, FIG. 15 is a cross-sectional view taken along a line F-F' in FIG. 14.

This embodiment is a modified example of the dummy wirings 401 for the second layer in embodiment 2 shown in FIG. 8. In the sealing material formation region, the linear dummy wirings for the first layer are first formed of the starting film of the scanning lines 702. Then, after the formation of the interlayer insulator 220, the starting film of the signal lines 703 is so patterned as to form the dummy wiring 701 for the second layer, and a passivation film 227 is formed on the surface. The dummy wirings 701 are so formed at regular intervals as to be superimposed on the dummy wirings 401 for the first layer and also to embed a region in which no dummy wirings 401 are formed. As a result, since the lower structure of the sealing material can be unified, a pressure can be uniformly applied to the sealing material when the substrates stick to each other. Further, convex portions having nearly the same step as that of a portion where the scanning lines 602 and the signal lines 603 are superimposed one on another are disposed at regular intervals in the sealing material formation region. Hence, since a pressure under which the substrates are stuck together is supported in the convex portion of the sealing formation region, the spacers can prevent the scanning lines 607 and the signal lines 703 from being short-circuited between the top and the bottom.

It should be noted that in embodiments 4 and 5, the uppermost layer of the substrate interval correction means disposed in the sealing material formation region 107 is formed of the passivation film 227. Alternatively, the pixel electrodes 228, a black matrix and so on may be further formed on the surface of the passivation film 227 in accordance with the process of fabricating the pixel section 102. As a result, the step of the substrate correction means can be made more equal to the step of the pixel section.

As was described above, in the liquid-crystal display device in accordance with the present invention, because the step corrected by the substrate interval correction means can be unified, the step of the sealing material per se can be similarly unified. Also, the substrate interval correction means prevents the matrix circuit from projecting from the sealing material even with the spacers. Hence, when the substrates stick to each other, the wirings can be prevented from being shirt-circuited with respect to the top and bottom in the peripheral drive circuit, thereby being capable of improving the yield of the peripheral drive circuit integral type liquid-crystal display device as well as the reliability. Further, since the substrate intervals can be uniformly maintained, the display nonuniformity disappears, thereby enabling high-accuracy display.

In addition, the substrate interval correction means in accordance with the present invention enables the matrix circuit and the peripheral drive circuit to be fabricated together without any increase in the number of processes.

What is claimed is:

1. An active matrix display device comprising:
a first substrate;
a first conductive line extending over the first substrate in a first direction;
a second conductive line extending over the first substrate in the first direction;
a first dummy wiring over the first substrate;
a second dummy wiring over the first substrate;
a second substrate opposed to the first substrate; and
a sealing member disposed between the first substrate and the second substrate,
wherein:
the first conductive line, the second conductive line, the first dummy wiring, and the second dummy wiring are formed from a same starting film,
the first substrate includes a first side edge extending in a second direction orthogonal to the first direction,
the sealing member includes a first region adjacent to the first side edge and extending in the second direction,
the first dummy wiring includes a region overlapped with the first region,
the second dummy wiring includes a region overlapped with the first region,
a distance from one end of the first dummy wiring to the other along the second direction is longer than a distance between the first conductive line and the second conductive line along the second direction,
a distance from one end of the second dummy wiring to the other along the second direction is longer than the distance between the first conductive line and the second conductive line along the second direction,
a distance from one end of the first dummy wiring to the other along the first direction is longer than a distance from one end of the first region of the sealing member to the other along the first direction,
a distance from one end of the second dummy wiring to the other along the first direction is longer than the distance from one end of the first region of the sealing member to the other along the first direction, a top surface and a side surface of the first dummy wiring are covered by a first insulator, a top surface and a side surface of the second dummy wiring are covered by the first insulator, and a bottom surface of the first dummy wiring and a bottom surface of the second dummy wiring are in contact with a second insulator.

2. The active matrix display device according to claim 1, wherein each of the first conductive line and the second conductive line is a scanning line.

3. The active matrix display device according to claim 1, wherein each of the first dummy wiring and the second dummy wiring has a crossed pattern.

4. The active matrix display device according to claim 1, further comprising:

a pixel portion including a plurality of thin film transistors; and a peripheral drive circuit portion for driving the pixel portion, wherein the peripheral drive circuit portion is arranged between the pixel portion and the first region of the sealing member.

5. The active matrix display device according to claim 4, wherein the plurality of thin film transistors are top-gate type thin film transistors.

6. The active matrix display device according to claim 4, wherein each of the plurality of thin film transistors includes a crystalline semiconductor.

7. The active matrix display device according to claim 1, wherein the first dummy wiring and the second dummy wiring are not in contact with a semiconductor film, wherein the first dummy wiring and the second dummy wiring are not in contact with a conductive film, wherein the first dummy wiring and the second dummy wiring do not overlap the semiconductor film, and wherein the first dummy wiring and the second dummy wiring do not overlap the conductive film.

8. The active matrix display device according to claim 1, further comprising:

a third conductive line extending over the first substrate in the first direction; and a fourth conductive line extending over the first substrate in the first direction, wherein the third conductive line and the fourth conductive line are formed from the same starting film as the first conductive line, the second conductive line, the first dummy wiring, and the second dummy wiring, wherein the first substrate includes a second side edge extending in the first direction and a third side edge extending in the first direction, wherein the third conductive line is adjacent to the second side edge comparing to the first conductive line and the second conductive line, wherein the fourth conductive line is adjacent to the third side edge comparing to the first conductive line and the second conductive line, and wherein the first dummy wiring and the second dummy wiring are arranged between a hypothesis extended line of the third conductive line and a hypothesis extended line of the fourth conductive line.

9. An active matrix display device comprising:

a first substrate;

a first conductive line extending over the first substrate in a first direction;

a second conductive line extending over the first substrate in the second first direction;

a first dummy wiring over the first substrate;

a second dummy wiring over the first substrate;

a second substrate opposed to the first substrate; and a sealing member disposed between the first substrate and the second substrate, wherein:

the first conductive line, the second conductive line, the first dummy wiring, and the second dummy wiring are formed from a same starting film, the first substrate includes a first side edge extending in a second direction orthogonal to the first direction, the sealing member includes a first region adjacent to the first side edge and extending in the second direction, a distance from one end of the first dummy wiring to the other along the second direction is longer than a distance between the first conductive line and the second conductive line along the second direction, a distance from one end of the second dummy wiring to the other along the second direction is longer than the distance between the first conductive line and the second conductive line along the second direction, the first dummy wiring includes:

a first portion; and a second portion adjacent to the first side edge comparing to the first portion and adjacent to the second dummy wiring comparing to the first portion, the second dummy wiring includes:

a third portion; and a fourth portion adjacent to the first side edge comparing to the third portion and adjacent to the first dummy wiring comparing to the third portion, the first portion is arranged in the second direction from the third portion, the second portion is arranged in the second direction from the fourth portion, the first portion, the second portion, the third portion, and the fourth portion are overlapped with the first region of the sealing member, a top surface and a side surface of the first dummy wiring are covered by a first insulator, a top surface and a side surface of the second dummy wiring are covered by the first insulator, and a bottom surface of the first dummy wiring and a bottom surface of the second dummy wiring are in contact with a second insulator.

10. The active matrix display device according to claim 9, wherein each of the first conductive line and the second conductive line is a scanning line.

11. The active matrix display device according to claim 9, wherein each of the first dummy wiring and the second dummy wiring has a crossed pattern.

12. The active matrix display device according to claim 9, further comprising:

a pixel portion including a plurality of thin film transistors; and a peripheral drive circuit portion for driving the pixel portion, wherein the peripheral drive circuit portion is provided arranged between the pixel portion and the first region of the sealing member.

13. The active matrix display device according to claim 12, wherein the plurality of thin film transistors are top-gate type thin film transistors.

14. The active matrix display device according to claim 12, wherein each of the plurality of thin film transistors includes a crystalline semiconductor.

15. The active matrix display device according to claim 9, wherein the first dummy wiring and the second dummy wiring are not in contact with a semiconductor film, wherein the first dummy wiring and the second dummy wiring are not in contact with a conductive film, wherein the first dummy wiring and the second dummy wiring do not overlap the semiconductor film, and wherein the first dummy wiring and the second dummy wiring do not overlap the conductive film.

16. The active matrix display device according to claim 9, further comprising:

a third conductive line extending over the first substrate in the first direction; and a fourth conductive line extending over the first substrate in the first direction, wherein the third conductive line and the fourth conductive line are formed from the same starting film as the first conductive line, the second conductive line, the first dummy wiring, and the second dummy wiring, wherein the first substrate includes a second side edge extending in the first direction and a third side edge extending in the first direction, wherein the third conductive line is adjacent to the second side edge comparing to the first conductive line and the second conductive line, wherein the fourth conductive line is adjacent to the third side edge comparing to the first conductive line and the second conductive line, and wherein the first dummy wiring and the second dummy wiring are arranged between a hypothesis extended line of the third conductive line and a hypothesis extended line of the fourth conductive line.

17. An active matrix display device comprising:

a first substrate;

a first conductive line extending over the first substrate in a first direction;

a second conductive line extending over the first substrate in the first direction;

a first dummy wiring over the first substrate;

a second dummy wiring over the first substrate;

a second substrate opposed to the first substrate; and a sealing member disposed between the first substrate and the second substrate, wherein:

the first conductive line, the second conductive line, the first dummy wiring, and the second dummy wiring are formed from a same starting film, the first substrate includes a first side edge extending in a second direction orthogonal to the first direction, the sealing member includes a first region adjacent to the first side edge and extending in the second direction, a distance from one end of the first dummy wiring to the other along the second direction is longer than a distance between the first conductive line and the second conductive line along the second direction, a distance from one end of the second dummy wiring to the other along the second direction is longer than the distance between the first conductive line and the second conductive line along the second direction, a distance from one end of the first dummy wiring to the other along the first direction is longer than a distance from one end of the first region of the sealing member to the other along the first direction, a distance from one end of the second dummy wiring to the other along the first direction is longer than the distance from one end of the first region of the sealing member to the other along the second first direction, the first dummy wiring includes:

a first portion; and a second portion adjacent to the first side edge comparing to the first portion and adjacent to the second dummy wiring comparing to the first portion, the second dummy wiring includes:

a third portion; and a fourth portion adjacent to the first side edge comparing to the third portion and adjacent to the first dummy wiring comparing to the third portion, the first portion is arranged in the second direction from the third portion, the second portion is arranged in the second direction from the fourth portion, the first portion, the second portion, the third portion, and the fourth portion are overlapped with the first region of the sealing member, a top surface and a side surface of the first dummy wiring are covered by a first insulator, a top surface and a side surface of the second dummy wiring are covered by the first insulator, and a bottom surface of the first dummy wiring and a bottom surface of the second dummy wiring are in contact with a second insulator.

18. The active matrix display device according to claim 17, wherein each of the first conductive line and the second conductive line is a scanning line.

19. The active matrix display device according to claim 17, wherein each of the first dummy wiring and the second dummy wiring has a crossed pattern.

20. The active matrix display device according to claim 17, further comprising:

a pixel portion including a plurality of thin film transistors; and a peripheral drive circuit portion for driving the pixel portion, wherein the peripheral drive circuit portion is arranged between the pixel portion and the first region of the sealing member.

21. The active matrix display device according to claim 20, wherein the plurality of thin film transistors are top-gate type thin film transistors.

22. The active matrix display device according to claim 20, wherein each of the plurality of thin film transistors includes a crystalline semiconductor.

23. The active matrix display device according to claim 17, wherein the first dummy wiring and the second dummy wiring are not in contact with a semiconductor film, wherein the first dummy wiring and the second dummy wiring are not in contact with a conductive film, wherein the first dummy wiring and the second dummy wiring do not overlap the semiconductor film, and wherein the first dummy wiring and the second dummy wiring do not overlap the conductive film.

24. The active matrix display device according to claim 17, further comprising:

a third conductive line extending over the first substrate in the first direction; and a fourth conductive line extending over the first substrate in the first direction, wherein the third conductive line and the fourth conductive line are formed from the same starting film as the first conductive line, the second conductive line, the first dummy wiring, and the second dummy wiring, wherein the first substrate includes a second side edge extending in the first direction and a third side edge extending in the first direction, wherein the third conductive line is adjacent to the second side edge comparing to the first conductive line and the second conductive line, wherein the fourth conductive line is adjacent to the third side edge comparing to the first conductive line and the second conductive line, and wherein the first dummy wiring and the second dummy wiring are arranged between a hypothesis extended line of the third conductive line and a hypothesis extended line of the fourth conductive line.

* * * * *